United States Patent
Yoneoka

(10) Patent No.: US 10,824,905 B2
(45) Date of Patent: Nov. 3, 2020

(54) INFORMATION PROCESSING DEVICE, INFORMATION PROCESSING METHOD, AND PROGRAM

(71) Applicant: FUJITSU LIMITED, Kawasaki-shi, Kanagawa (JP)

(72) Inventor: Noboru Yoneoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 16/115,601

(22) Filed: Aug. 29, 2018

(65) Prior Publication Data
US 2019/0065902 A1 Feb. 28, 2019

(30) Foreign Application Priority Data

Aug. 31, 2017 (JP) .................................. 2017-166444

(51) Int. Cl.
*G06K 9/62* (2006.01)
*G06T 7/174* (2017.01)
(Continued)

(52) U.S. Cl.
CPC ......... *G06K 9/6218* (2013.01); *G06K 9/4642* (2013.01); *G06K 9/6202* (2013.01);
(Continued)

(58) Field of Classification Search
CPC .... G06K 9/6298; G06K 9/4642; G06K 9/623; G06K 9/6218; G06K 2009/4666;
(Continued)

(56) References Cited

U.S. PATENT DOCUMENTS

2002/0029235 A1* 3/2002 Lock .................. G01N 15/1456
708/814
2006/0251292 A1* 11/2006 Gokturk .................. G06F 16/58
382/103
(Continued)

FOREIGN PATENT DOCUMENTS

| JP | 9-44652 | 2/1997 |
|----|---------|--------|
| JP | 2015-225353 | 12/2015 |
| JP | 2016-143360 | 8/2016 |

OTHER PUBLICATIONS

Hadjidemetriou et al. ("Multiresolution histograms and their use for recognition," IEEE Transactions on Pattern Analysis and Machine Intelligence, vol. 26, Issue: 7, Jul. 2004) (Year: 2004).*
(Continued)

*Primary Examiner* — Yubin Hung
(74) *Attorney, Agent, or Firm* — Fujitsu Patent Center

(57) ABSTRACT

An apparatus includes a distribution generator configured to determine a combination of each of first regions in a first image and a corresponding one of second regions in a second image based on feature amounts of the first regions and feature amounts of the second regions, and generate first distribution information indicating distribution of the difference between a first position of a first region in the first image and a second position of a second region in the second image; a similarity generator configured to generate second distribution information indicating distribution of the difference between the first position and the second position, calculate a first similarity between the first image and the second image, and calculate a second similarity between the first image and the second image; and a processor configured to generate a comparison result by comparing the first image and the second image.

12 Claims, 24 Drawing Sheets

(51) Int. Cl.
*G06T 7/11* (2017.01)
*G06K 9/46* (2006.01)

(52) U.S. Cl.
CPC ............ *G06K 9/623* (2013.01); *G06K 9/6211* (2013.01); *G06K 9/6212* (2013.01); *G06K 9/6298* (2013.01); *G06T 7/11* (2017.01); *G06T 7/174* (2017.01); *G06K 2009/4666* (2013.01)

(58) Field of Classification Search
CPC .. G06K 9/6202; G06K 9/6211; G06K 9/6212; G06T 7/174; G06T 7/11
See application file for complete search history.

(56) References Cited

U.S. PATENT DOCUMENTS

| | | | | |
|---|---|---|---|---|
| 2010/0111400 A1* | 5/2010 | Ramirez | ............ | G06K 9/00147 382/134 |
| 2010/0195048 A1* | 8/2010 | Hammer | ............... | A61B 3/1025 351/206 |
| 2010/0329556 A1* | 12/2010 | Mitarai | ................ | G06K 9/6251 382/170 |
| 2013/0022280 A1* | 1/2013 | Liu | ....................... | G06K 9/6202 382/224 |
| 2013/0336547 A1* | 12/2013 | Komogortsev | ........ | A61B 5/117 382/117 |
| 2016/0033272 A1* | 2/2016 | Struckhoff | .............. | G01S 17/08 356/4.01 |
| 2017/0300621 A1* | 10/2017 | Lee | ......................... | G06F 16/56 |
| 2018/0018499 A1* | 1/2018 | Lei | ........................... | G06K 9/34 |

OTHER PUBLICATIONS

M. Calonder et al., "BRIEF: Binary Robust Independent Elementary Features", In Proceedings of the European Conference on Computer Vision (ECCV) 2010, pp. 778-792, 2010 (836 pages).

* cited by examiner

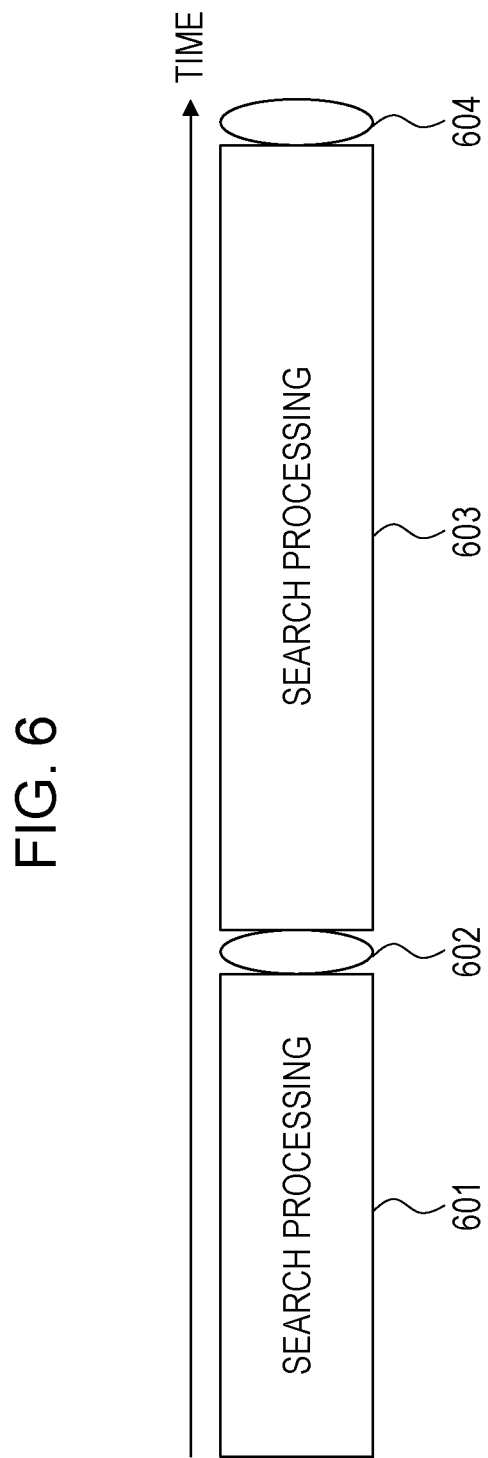

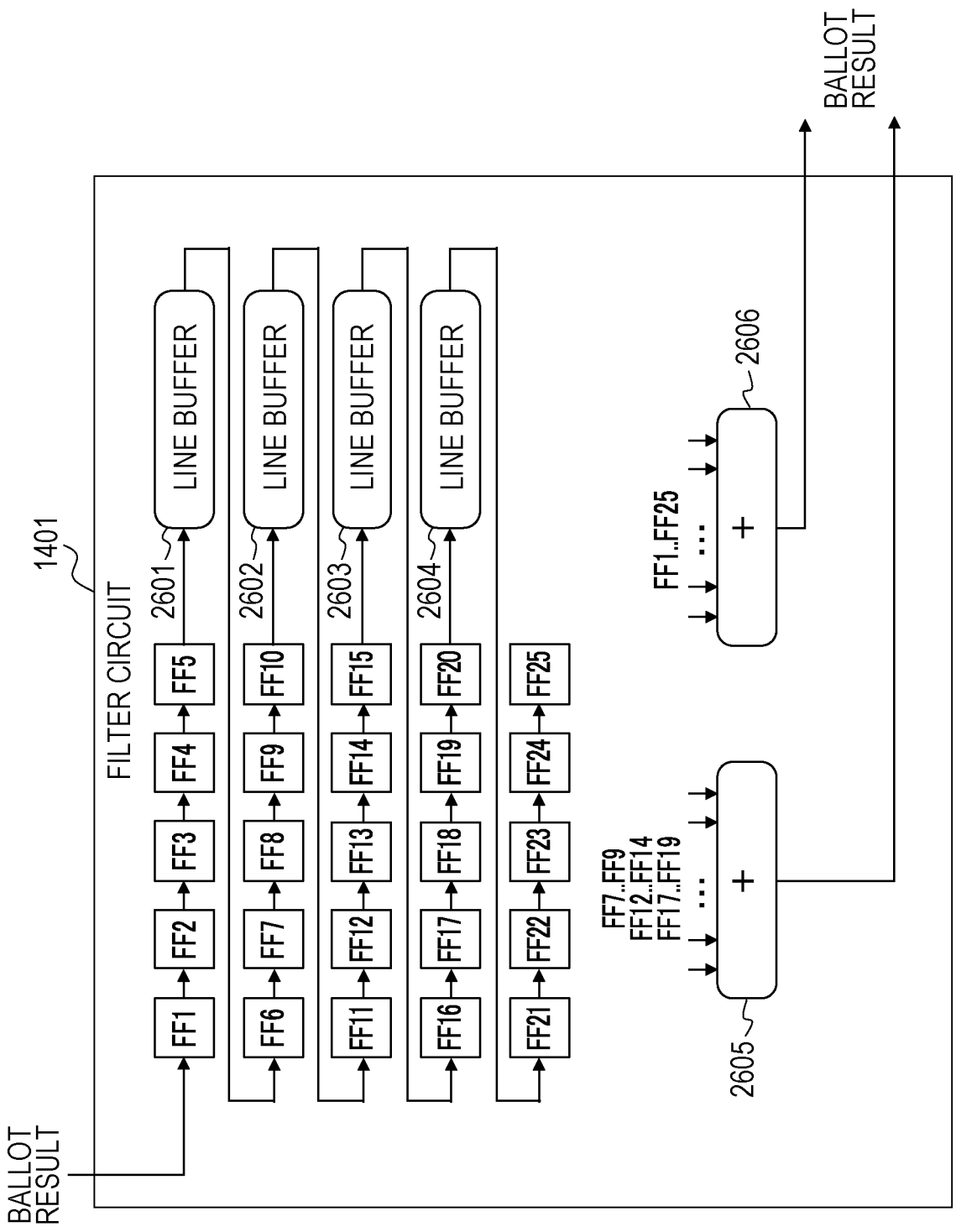

INFORMATION PROCESSING DEVICE, INFORMATION PROCESSING METHOD, AND PROGRAM

CROSS-REFERENCE TO RELATED APPLICATION

This application is based upon and claims the benefit of priority of the prior Japanese Patent Application No. 2017-166444, filed on Aug. 31, 2017, the entire contents of which are incorporated herein by reference.

FIELD

The embodiment discussed herein is related to an information processing device, an information processing method, and a program.

BACKGROUND

When a large number of DB images accumulated in a database (DB) is searched for a target image, matching processing is performed to compare the feature amount of each DB image with the feature amount of a query image input as a query.

The matching processing uses a method of searching for a feature point in the query image corresponding to a feature point in each DB image by comparing the local feature amount of each feature point in the DB image and the local feature amount of each feature point in the query image (see Japanese Laid-open Patent Publication Nos. 2015-225353 and 2016-143360, for example).

One of known feature amounts is a bit-string feature amount called binary robust independent elementary features (BRIEF) (see M. Calonder, V. Lepetit, C. Strecha, and P. Fua., "BRIEF: Binary Robust Independent Elementary Features", In Proceedings of the European Conference on Computer Vision (ECCV) 2010, pp. 778 to 792, 2010, for example).

In a known image processing method, spatial filter processing is performed on a region in an image to extract feature amounts in the region (see Japanese Laid-open Patent Publication No. 9-44652, for example).

SUMMARY

According to an aspect of the embodiments, an information processing device includes a distribution generator configured to determine a combination of each of a plurality of regions in a first image and a corresponding one of a plurality of regions in a second image based on feature amounts, represented by a string of bits, of the regions in the first image and feature amounts of the regions in the second image, and generate first distribution information indicating distribution of the difference between a position of a first region in the first image and a position of a second region in the second image that are included in each of the combinations; a similarity generator configured to generate second distribution information indicating distribution of the difference between the position of the first region and the position of the second region by applying a spatial filter to the first distribution information, calculate a first similarity between the first image and the second image based on the first distribution information, and calculate a second similarity between the first image and the second image based on the second distribution information; and a processor configured to generate a comparison result by comparing the first image and the second image based on the first similarity and the second similarity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating the processing time of the matching processing;
FIG. 26 is a configuration diagram of a filter circuit including a plurality of spatial filters.

DESCRIPTION OF EMBODIMENTS

When the similarity between a DB image and a query image is calculated, it is desired to allow variation in the difference between the position of a region in the DB image and the position of the corresponding region in the query image in some cases.

In such a case, the processing time is increased by calculating a plurality of similarities differently affected by the difference variation between the DB image and the query image.

This problem is not limited to matching processing of comparing a DB image and a query image but also occurs to any other image processing of comparing two images.

An embodiment will be described below in detail with reference to the accompanying drawings.

Figure 1:
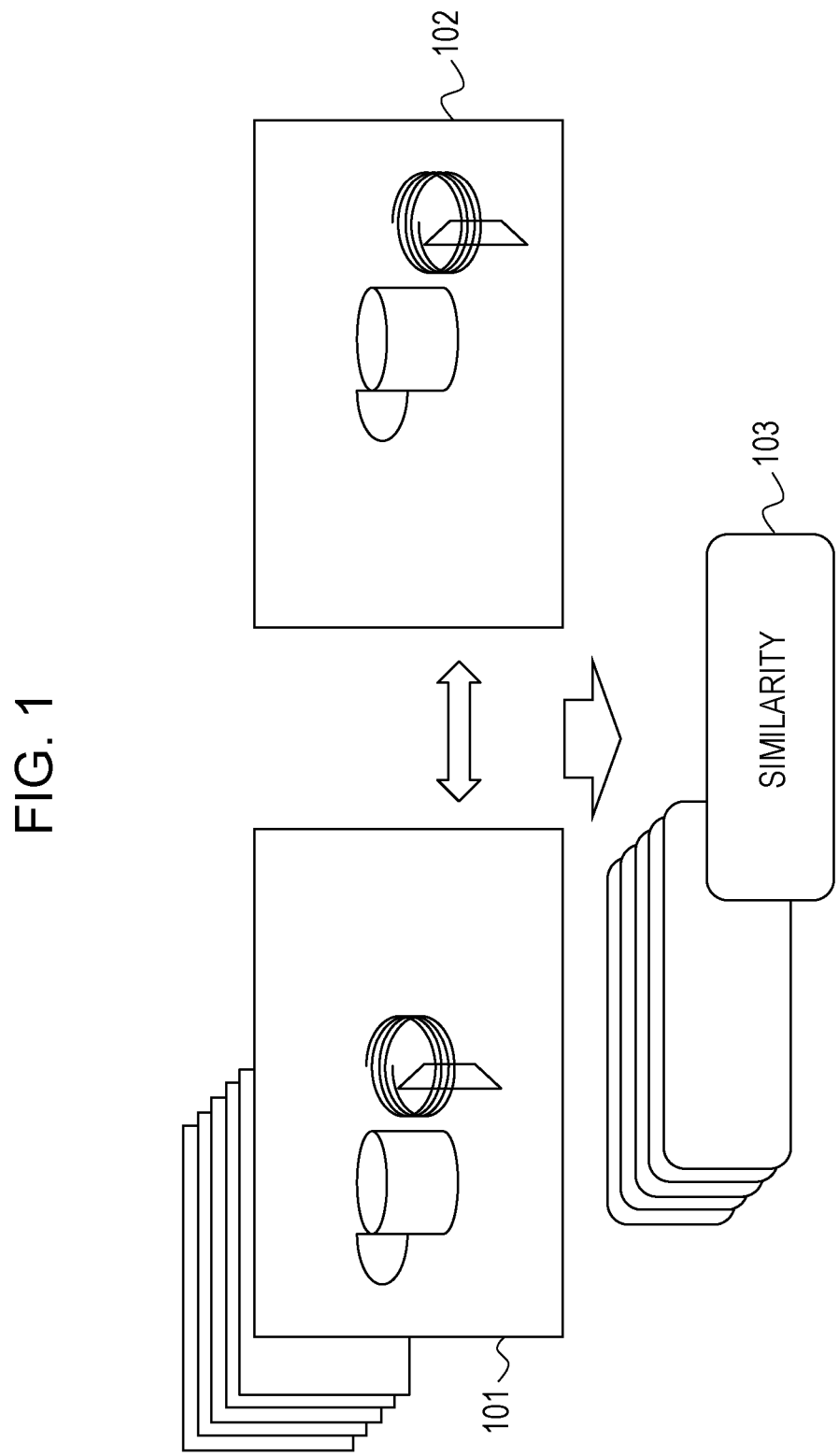
FIG. 1 is a diagram illustrating matching processing.

FIG. 1 illustrates exemplary matching processing in which an information processing device compares a DB image and a query image. In the matching processing illustrated in FIG. 1, each of a plurality of DB images 101 accumulated in a database is compared with a query image 102 for image search, and a similarity 103 is calculated for each DB image 101. The matching processing includes feature point pair calculation, ballot processing, similarity calculation, and determination processing.

Figure 2:
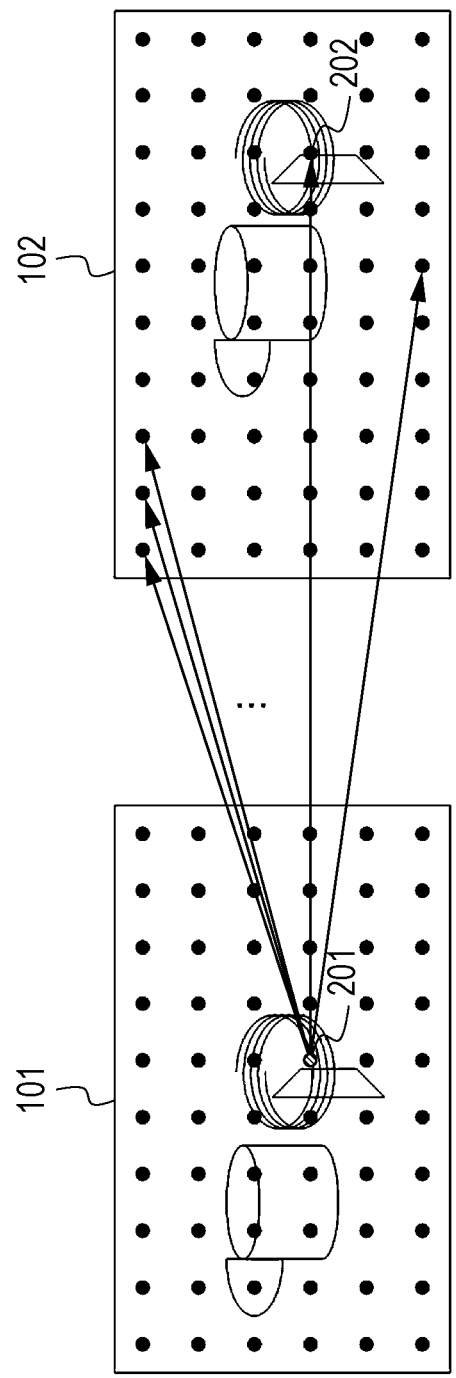
FIG. 2 is a diagram illustrating feature point pair calculation.

FIG. 2 illustrates exemplary feature point pair calculation. In the feature point pair calculation, first, the information processing device determines feature point disposition in each image. Various kinds of disposition are applicable as the feature point disposition. For example, lattice disposition using a simple lattice with a fixed interval may be employed. Subsequently, the information processing device calculates a binary feature amount of each feature point.

The binary feature amount of a feature point is calculated by using the pixel values of a plurality of pixels in a predetermined region including the feature point, and represents a local image feature in the predetermined region. For example, a rectangle region is applicable as the predetermined region including a feature point, and a BRIEF is applicable as the binary feature amount. Subsequently, the information processing device calculates a Hamming distance between the binary feature amount of each feature point in each DB image 101 and the binary feature amounts of all feature points in the query image 102, and selects a feature point in the query image 102 having the smallest Hamming distance from the feature point in the DB image 101.

Then, the information processing device generates a combination (feature point pair) of each feature point in each DB image 101 and the selected feature point in the query image 102.

Figure 3:
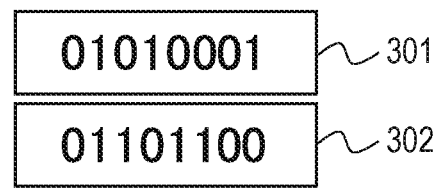
FIG. 3 is a diagram illustrating binary feature amounts.

FIG. 3 illustrates exemplary binary feature amounts. When a feature point in a DB image 101 has a binary feature amount 301 of "01010001" and a feature point in the query image 102 has a binary feature amount 302 of "01101100", the Hamming distance between these binary feature amounts is 5. The Hamming distance indicates the number of bit positions having values different between two bit strings. Thus, when a binary feature amount is a bit string of 128 bit, the Hamming distance has a minimum value of 0 and a maximum value of 128.

The information processing device generates feature point pairs for all feature points in all DB images 101, and thus the number of generated feature point pairs is expressed as the product of the number of feature points in each DB image 101 and the number of DB images 101. Subsequently, the information processing device performs the ballot processing on each DB image 101 by using a ballot map memory configured to store ballot results. The ballot map memory includes a plurality of ballot boxes. Each ballot box indicates the range (difference range) of the difference between the position of a feature point in the DB image 101 and the position of a feature point in the query image 102 that are included in a feature point pair.

A ballot result stored in each ballot box indicates the number of feature point pairs each having a difference belonging to the difference range indicated by the ballot box among feature point pairs for the DB image 101. The size (width) of the DB image 101 in the horizontal direction is denoted by Wd, the size (height) of the DB image 101 in the vertical direction is denoted by Hd, the width of the query image 102 is denoted by Wq, and the height of the query image 102 is denoted by Hq. In this case, the ballot map memory has a width Wm and a height Hm that are determined by expressions below.

$$Wm=(Wd+Wq+D/2)/D \quad (1)$$

$$Hm=(Hd+Hq+D/2)/D \quad (2)$$

In Expressions (1) and (2), the parameter D is an integer equal to or larger than one, and defines the difference range indicated by each ballot box. Each rectangular region of D×D is used as one ballot box, and the number of ballot boxes included in the ballot map memory is Wm×Hm. In Expressions (1) and (2), the division symbol "/" represents division that rounds any decimal fraction. Accordingly, the right hand side of Expression (1) represents a value obtained by rounding a result of division of "Wd+Wq" by D, and the right hand side of Expression (2) represents a value obtained by rounding a result of division of "Hd+Hq" by D.

It is possible to reduce use of resources of the ballot map memory and absorb variance in the difference of a feature point pair by setting D to be an appropriate integer equal to or larger than two. In the ballot processing, first, the information processing device initializes ballot results in all ballot boxes of the ballot map memory to zero. Subsequently, the information processing device calculates the coordinates (Px, Py) of each ballot box in the ballot map memory from the difference between the coordinates (Xd, Yd) of a feature point in the DB image 101 included in each feature point pair and the coordinates (Xq, Yq) of a feature point in the query image 102 by expressions below.

$$Px=(Xq-Xd+(Wd-1)+D/2)/D \quad (3)$$

$$Py=(Yq-Yd+(Hd-1)+D/2)/D \quad (4)$$

In the DB image 101, the upper-left apex of the DB image 101 corresponds to the origin of an XY coordinate system, the X axis of which represents the horizontal direction, and the Y axis of which represents the vertical direction.

In the query image 102, the upper-left apex of the query image 102 corresponds to the origin of an XY coordinate system, the X axis of which represents the horizontal direction, and the Y axis of which represents the vertical direction. With this notation, Px in Expression (3) represents a difference range to which the X-coordinate difference of "Xq−Xd" belongs, and Py in Expression (4) indicates a difference range to which the Y-coordinate difference of "Yq−Yd" belongs. Hereinafter, the coordinates (Px, Py) of a ballot box are also referred to as ballot point coordinates. The addition of "Wd−1" to "Xq−Xd" on the right hand side of Expression (3) ensures that, when Wq=Wd and Xq−Xd=0, Px takes a value indicating a ballot box at the center of the ballot map memory in the horizontal direction.

Similarly, the addition of "Hd−1" to "Yq−Yd" on the right hand side of Expression (4) ensures that, when Hq=Hd and Yq−Yd=0, Py takes a value indicating a ballot box at the center of the ballot map memory in the vertical direction. The information processing device increments, by one, the ballot result in a ballot box at a position represented by the ballot point coordinates (Px, Py) in the ballot map memory, thereby updating the ballot result in the ballot box.

Consider a case in which a feature point 201 in a DB image 101 and a feature point 202 in the query image 102 in FIG. 2 form a feature point pair.

When Wd=Wq=Hd=Hq=200, D=8, the coordinates (Xd, Yd) of the feature point 201 are (120, 102), and the coordinates (Xq, Yq) of the feature point 202 are (150, 102), the ballot point coordinates (Px, Py) are calculated by expressions below.

$$Px=(120-150+(200-1)+8/2)/8=21 \quad (5)$$

$$Py=(102-102+(200-1)+8/2)/8=25 \quad (6)$$

In this case, the ballot result in a ballot box at a position represented by the coordinates (21, 25) is incremented by one.

Figure 4A:
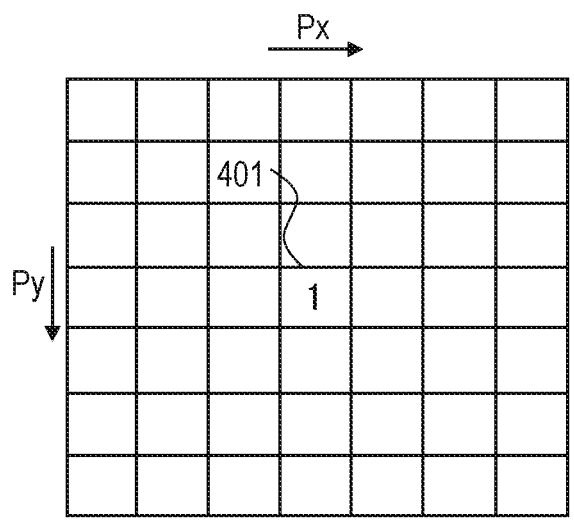
FIGS. 4A and 4B are each a diagram illustrating a ballot map memory.
Figure 4B:
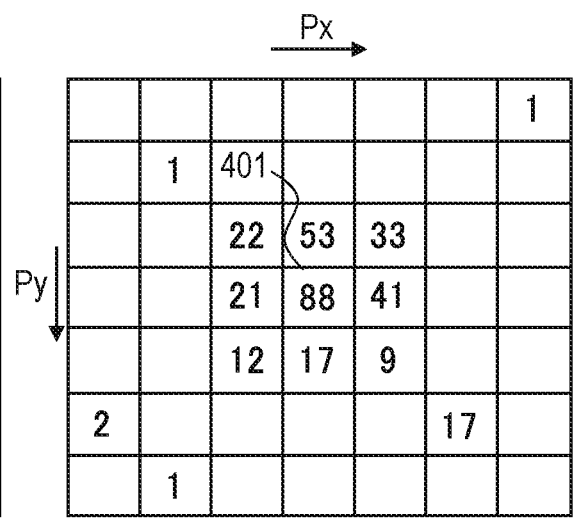

FIGS. 4A and 4B each illustrate an exemplary ballot map memory.

FIG. 4A illustrates a ballot result obtained by using the first feature point pair for one DB image 101.

In FIG. 4A, the ballot result in a ballot box 401 at the center of the ballot map memory is updated from zero to one.

FIG. 4B illustrates a ballot result obtained by using all feature points pair for one DB image 101.

In FIG. 4B, the ballot results in a plurality of ballot boxes in the ballot map memory are incremented, and the ballot result in the ballot box 401 is updated to 88.

The ballot result illustrated in FIG. 4B corresponds to a histogram representing distribution of a coordinate difference of each feature point pair in the DB image 101. In the similarity calculation, the information processing device extracts, for each DB image 101, the maximum value of the ballot result stored in each ballot box as the similarity between the DB image 101 and the query image 102. In the determination processing, the information processing device determines a comparison result by comparing each DB image 101 and the query image 102 based on the similarity.

For example, when the similarity is equal to or larger than a threshold, the information processing device determines that the DB image 101 is similar to the query image 102. When the similarity is smaller than the threshold, the information processing device determines that the DB image 101 is not similar to the query image 102. Then, the information processing device outputs a result of the determination.

The information processing device may output, as the determination result, a predetermined number of DB image 101 in descending order of similarity. In the matching processing, the DB image 101 and the query image 102 are compared in some cases with some variation allowed in the shape of any object between the images. In such a case, it is expected to be effective to ballot, for each feature point pair, not a single ballot box to which the coordinate difference thereof belongs but a plurality of ballot boxes surrounding the single ballot box.

Figure 5A:
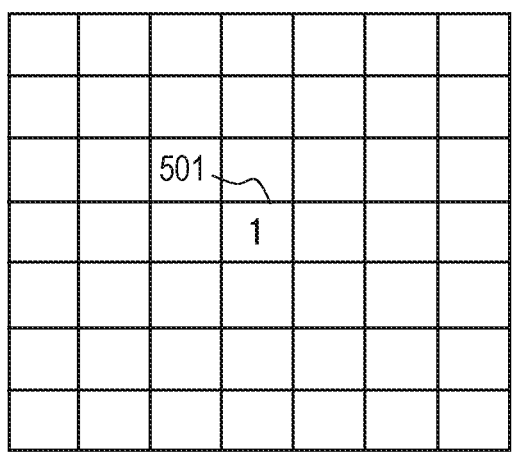
FIGS. 5A and 5B are each a diagram illustrating ballot processing.
Figure 5B:
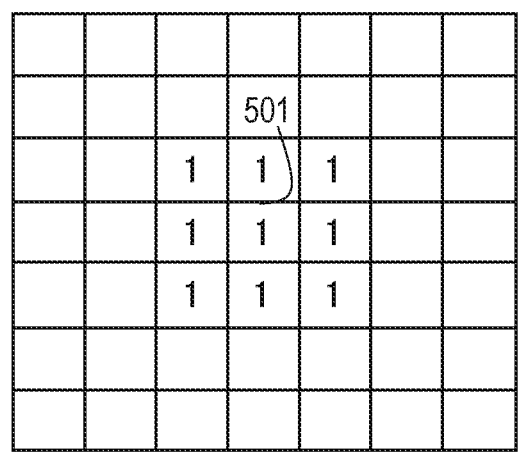

FIGS. 5A and 5B each illustrate exemplary ballot processing.

FIG. 5A illustrates the ballot processing of balloting a single ballot box.

In FIG. 5A, the ballot result in a ballot box 501 to which a coordinate difference belongs is updated from zero to one.

FIG. 5B illustrates the ballot processing of balloting a plurality of ballot boxes.

In FIG. 5B, the ballot box 501 to which the coordinate difference belongs and the ballot results in eight ballot boxes surrounding the ballot box 501 are updated from zero to one. For example, when a two-port (1R1W) memory is used as the ballot map memory and N×N (N is an odd number equal to or larger than three) ballot boxes including a ballot box to which a coordinate difference belongs are balloted, the number of times of access to the ballot map memory is N^2. Accordingly, the speed of the matching processing decreases.

FIG. 6 illustrates an exemplary processing time of the matching processing involving the ballot processing of balloting a single ballot box and the ballot processing of balloting a plurality of ballot boxes. The information processing device first performs search processing 601 through the ballot processing of balloting a single ballot box, and then performs determination processing 602 of determining a result of the search processing 601.

In the search processing 601, a DB image 101 similar to the query image 102 is searched for with no variation allowed in the shape of an object.

Subsequently, the information processing device performs search processing 603 through the ballot processing of balloting a plurality of ballot boxes, and then performs determination processing 604 of determining a result of the search processing 603. In the search processing 603, a DB image 101 similar to the query image 102 is searched for with variation allowed in the shape of an object. The search processing 601 and the search processing 603 each include feature point pair calculation, ballot processing, and similarity calculation.

In the matching processing illustrated in FIG. 6, since the search processing 603, which takes a longer time, is performed following the search processing 601, the processing time of the matching processing is more than twice as long as the processing time of the search processing 601.

Figure 7:
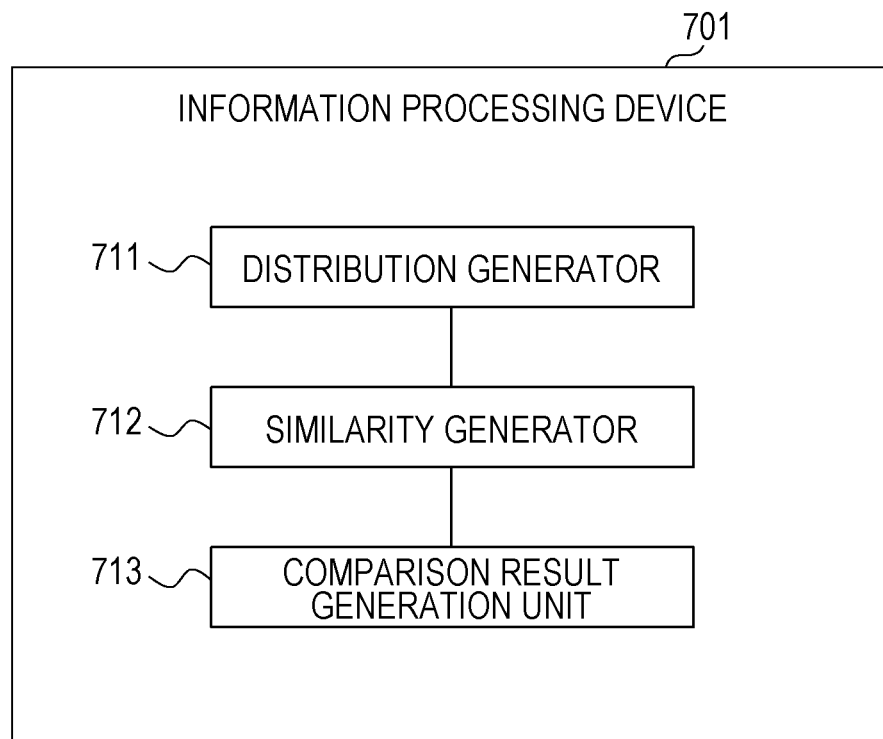
FIG. 7 is a functional configuration diagram of an information processing device.

FIG. 7 illustrates an exemplary functional configuration of the information processing device according to the embodiment. This information processing device 701 illustrated in FIG. 7 includes a distribution generator 711, a similarity generator 712, and a comparison result generation unit 713.

Figure 8:
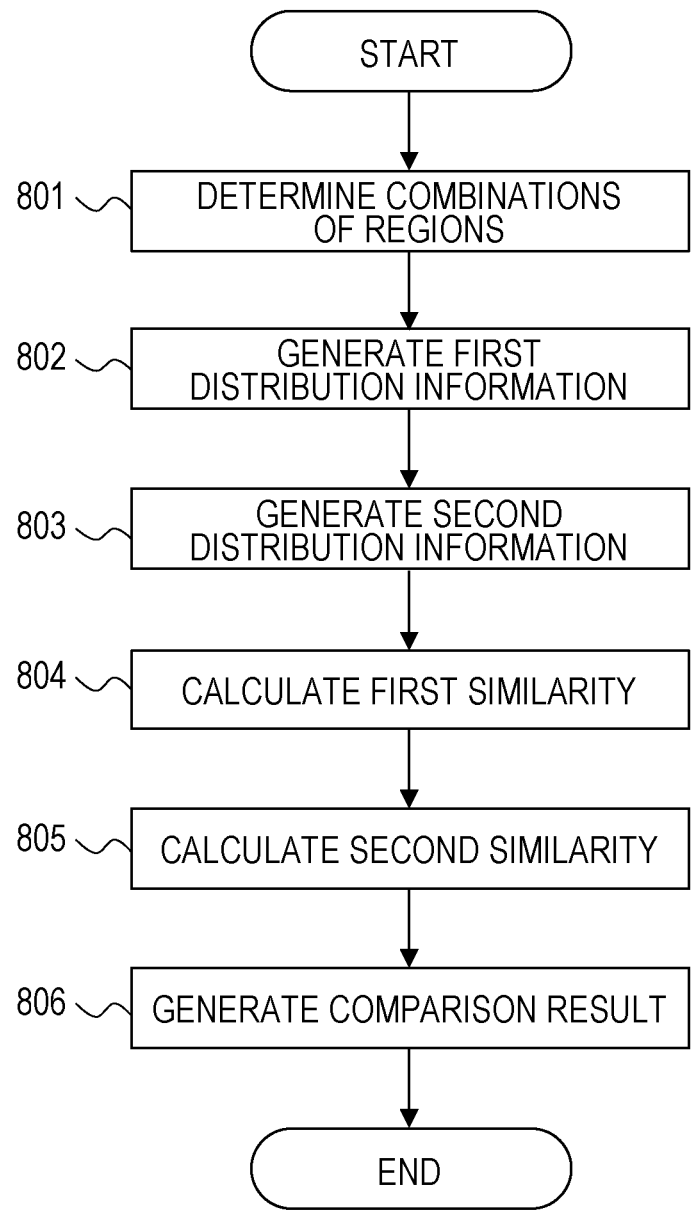
FIG. 8 is a flowchart of image processing.

FIG. 8 is a flowchart illustrating exemplary image processing performed by the information processing device 701 illustrated in FIG. 7.

First, the distribution generator 711 determines a combination of each of a plurality of regions in a first image and the corresponding region in a second image based on the feature amounts of the regions in the first image and the feature amounts of the regions in the second image (step 801). Subsequently, the distribution generator 711 generates first distribution information indicating distribution of the difference between the position of a first region in the first image and the position of a second region in the second image that are included in each combination (step 802).

Subsequently, the similarity generator 712 generates second distribution information indicating distribution of the difference between the position of the first region and the position of the second region by applying a spatial filter to the first distribution information (step 803).

Subsequently, the similarity generator 712 calculates a first similarity between the first image and the second image based on the first distribution information (step 804), and calculates a second similarity between the first image and the second image based on the second distribution information (step 805).

Then, the comparison result generation unit 713 generates a comparison result by comparing the first image and the second image based on the first similarity and the second similarity (step 806).

The information processing device 701 illustrated in FIG. 7 may calculate, based on the difference between the positions of two regions corresponding to each other in two respective images, two similarities differently affected by variation in the difference.

Figure 9:
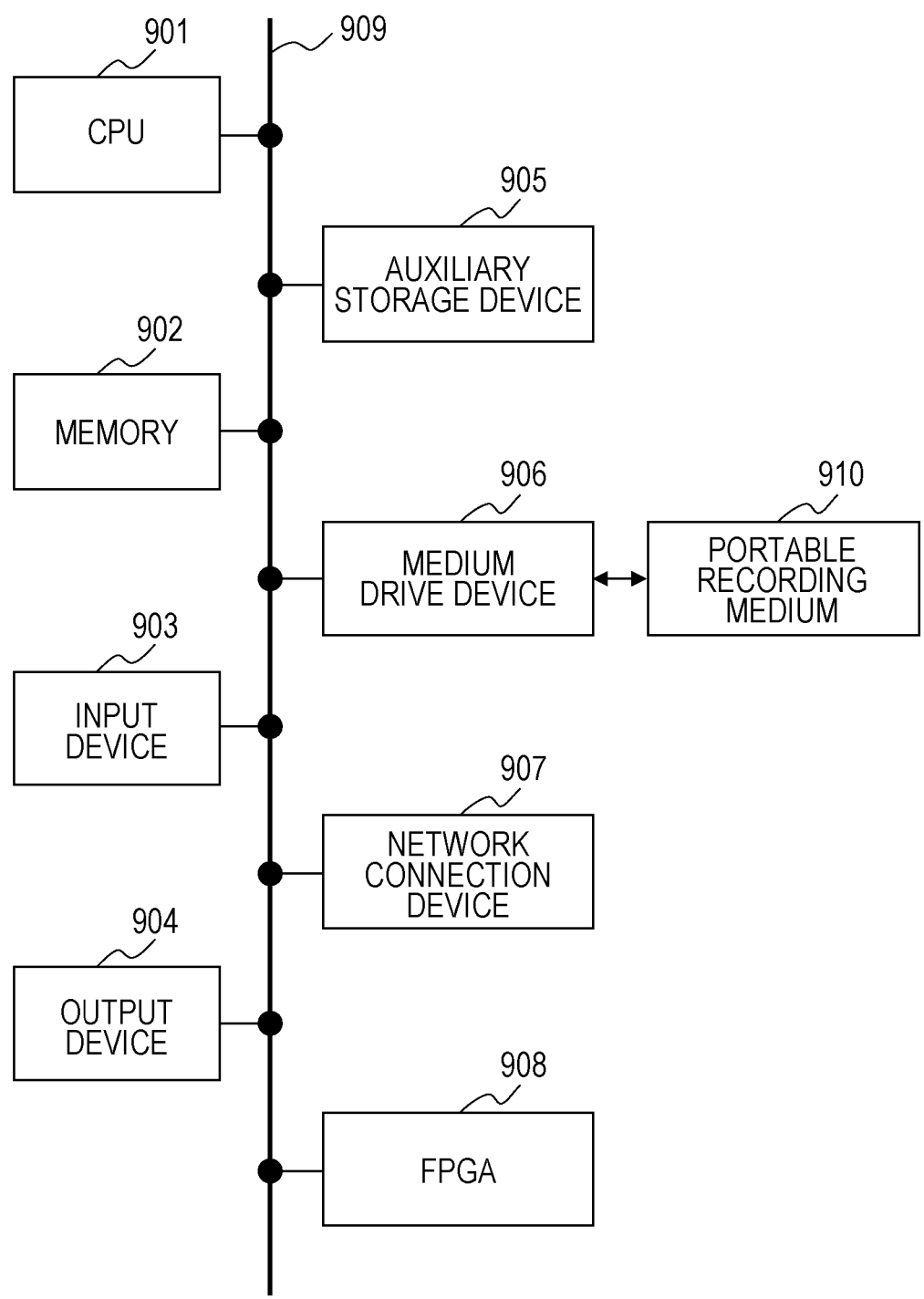
FIG. 9 is a hardware configuration diagram of the information processing device.

FIG. 9 illustrates an exemplary hardware configuration of the information processing device 701 illustrated in FIG. 7.

The information processing device 701 illustrated in FIG. 9 includes a central processing unit (CPU) 901, a memory 902, an input device 903, an output device 904, an auxiliary storage device 905, a medium drive device 906, and a network connection device 907.

The information processing device 701 further includes a field-programmable gate array (FPGA) 908.

These components are connected with each other through a bus 909.

The memory 902 is, for example, a semiconductor memory such as a read only memory (ROM), a random access memory (RAM), or a flash memory, and stores any program and data used in processing. The CPU 901 (processor) performs matching processing of comparing a plurality of DB images and a query image by, for example, executing a program through the memory 902. For example, each DB image corresponds to a first image, and the query image corresponds to a second image.

In the matching processing, the CPU 901 searches a plurality of DB images for a DB image similar to the query image. First, the CPU 901 calculates the coordinates and feature amount of each feature point in the DB images and the query image, and stores the calculated coordinates and feature amount of the feature point in the memory 902 as a database. The feature amount of a feature point may be a binary feature amount representing a local image feature of a predetermined region including the feature point. Subsequently, the CPU 901 forwards the coordinates and feature amount of each feature point from the memory 902 to the FPGA 908, and receives a plurality of similarities between each DB image and the query image from the FPGA 908.

These similarities include the first similarity and the second similarity. The CPU 901 may store the coordinates and feature amount of each feature point in the auxiliary storage device (memory) 905. In the matching processing, the CPU 901 also functions as the comparison result generation unit 713 illustrated in FIG. 7, and generates a comparison result by comparing each DB image and the query image.

In this process, the CPU 901 calculates a similarity score from the plurality of similarities to each DB image, and determines whether the DB image is similar to the query image based on the similarity score. The input device 903 is, for example, a keyboard or a pointing device, and used to input instructions or information from a user or an operator. The output device 904 is, for example, a display device, a printer, or a speaker, and used to output queries and processing results to the user or the operator. The processing result includes the comparison result obtained by comparing each DB image and the query image.

The auxiliary storage device 905 is, for example, a magnetic disk device, an optical disk device, a magneto optical disc device, or a tape device. The auxiliary storage device 905 may be a hard disk drive.

The information processing device may store programs and data in the auxiliary storage device 905, and load and use the programs and data on the memory 902. The data stored in the auxiliary storage device 905 includes DB images and query images.

The medium drive device 906 drives a portable recording medium 910 and accesses contents recorded therein. The portable recording medium 910 is, for example, a memory device, a flexible disk, an optical disk, or a magneto optical disc. The portable recording medium 910 may be a compact disk read only memory (CD-ROM), a digital versatile disk (DVD), or a Universal Serial Bus (USB) memory.

The user or the operator may record programs and data in the portable recording medium 910, and load and use the programs and data on the memory 902. The user or the operator may also record programs for the FPGA 908 in the portable recording medium 910, and use the programs to reconstruct the FPGA 908. In this manner, computer-readable recording media configured to store programs and data used in processing include physical (non-transitory) recording media such as the memory 902, the auxiliary storage device 905, and the portable recording medium 910.

The network connection device 907 is a communication interface circuit connected with a communication network such as a local area network (LAN) or a wide area network (WAN) and configured to perform data conversion involved in communication.

The information processing device may receive programs and data from an external device through the network connection device 907, and load and use the programs and data on the memory 902.

The information processing device may receive programs for the FPGA 908 from an external device through the network connection device 907, and use the programs to reconstruct the FPGA 908.

The FPGA 908 functions as the distribution generator 711 and the similarity generator 712 illustrated in FIG. 7, and performs feature point pair calculation, ballot processing, and similarity calculation by using the coordinates and feature amounts of feature points received from the CPU 901. Then, the FPGA 908 forwards a plurality of similarities to each DB image to the CPU 901.

Figure 10:
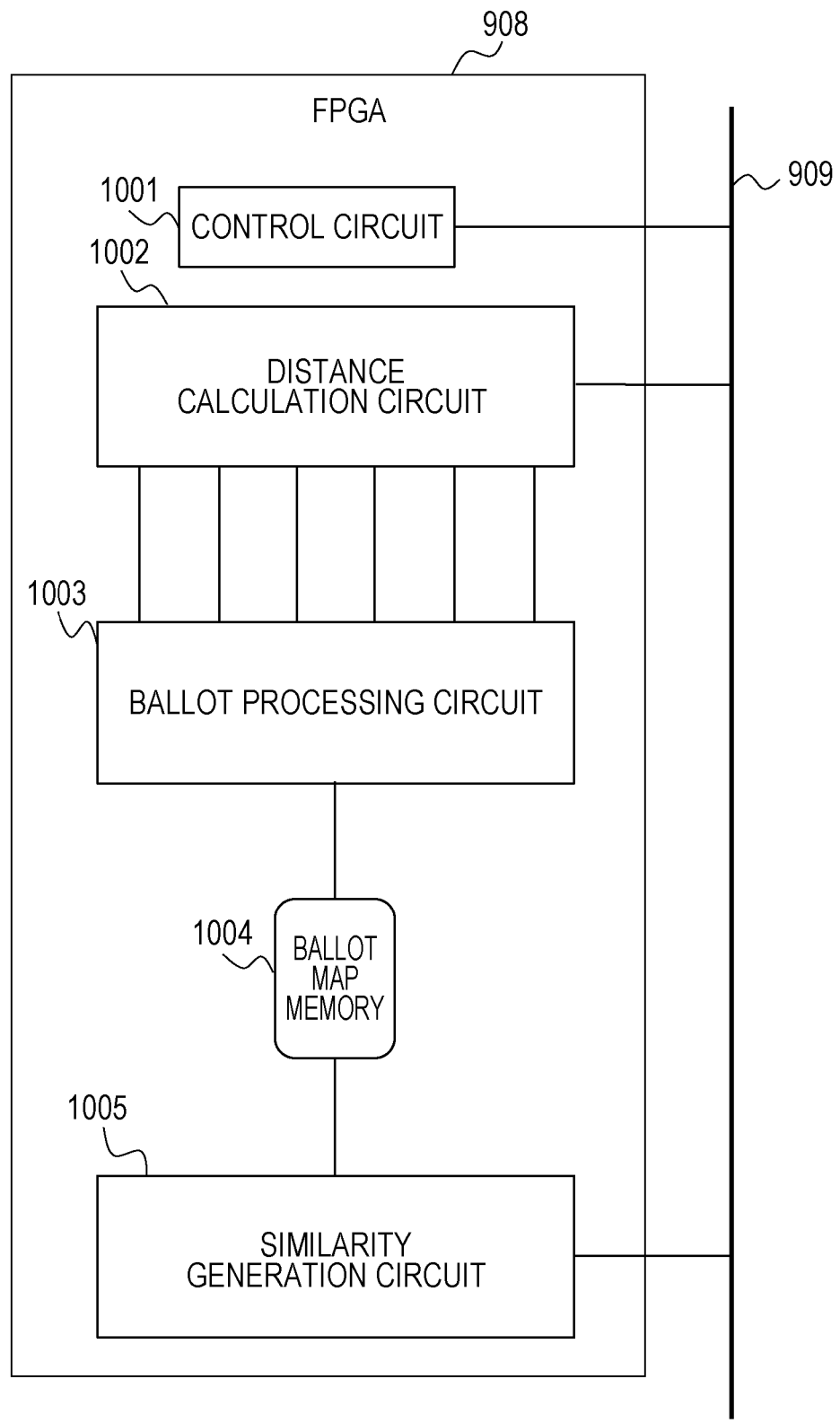
FIG. 10 is a configuration diagram of a FPGA.

FIG. 10 illustrates an exemplary configuration of the FPGA 908 illustrated in FIG. 9. The FPGA 908 illustrated in FIG. 10 includes a control circuit 1001, a distance calculation circuit 1002, a ballot processing circuit 1003, a ballot map memory 1004, and a similarity generation circuit 1005.

The ballot processing circuit 1003 and the ballot map memory 1004 correspond to the distribution generator 711, and the similarity generation circuit 1005 corresponds to the similarity generator 712.

The control circuit 1001 communicates the CPU 901 through the bus 909 to control activation and stopping of the FPGA 908. The control circuit 1001 also controls the distance calculation circuit 1002, the ballot processing circuit 1003, and the similarity generation circuit 1005.

The distance calculation circuit 1002 reads the coordinates and feature amount of each feature point in DB images and a query image from the memory 902, and performs distance calculation to generate feature point pairs. Then, the distance calculation circuit 1002 calculates ballot point coordinates from the coordinate difference between the coordinates of a feature point in the DB image included in each feature point pair the coordinates of a feature point in the query image, and outputs the calculated ballot point coordinates to the ballot processing circuit 1003.

The ballot processing circuit 1003 performs the ballot processing by using the ballot map memory 1004 based on the ballot point coordinates output from the distance calculation circuit 1002, and the ballot map memory 1004, and stores a ballot result in each ballot box indicated by the ballot point coordinates.

The similarity generation circuit 1005 calculates a plurality of similarities between each DB image and the query image from the ballot results stored in the ballot map memory 1004, and forwards the similarities to the CPU 901.

The distance calculation circuit 1002 and the ballot processing circuit 1003 simultaneously operate, and the ballot processing circuit 1003 and the similarity generation circuit 1005 exclusively operate with respect to the ballot map memory 1004.

The ballot map memory 1004 is a two-port (1R1W) memory to be accessed through a selector (not illustrated), and allows any one of 1R1W access from the ballot processing circuit 1003 and 1R access from the similarity generation circuit 1005.

Figure 11:
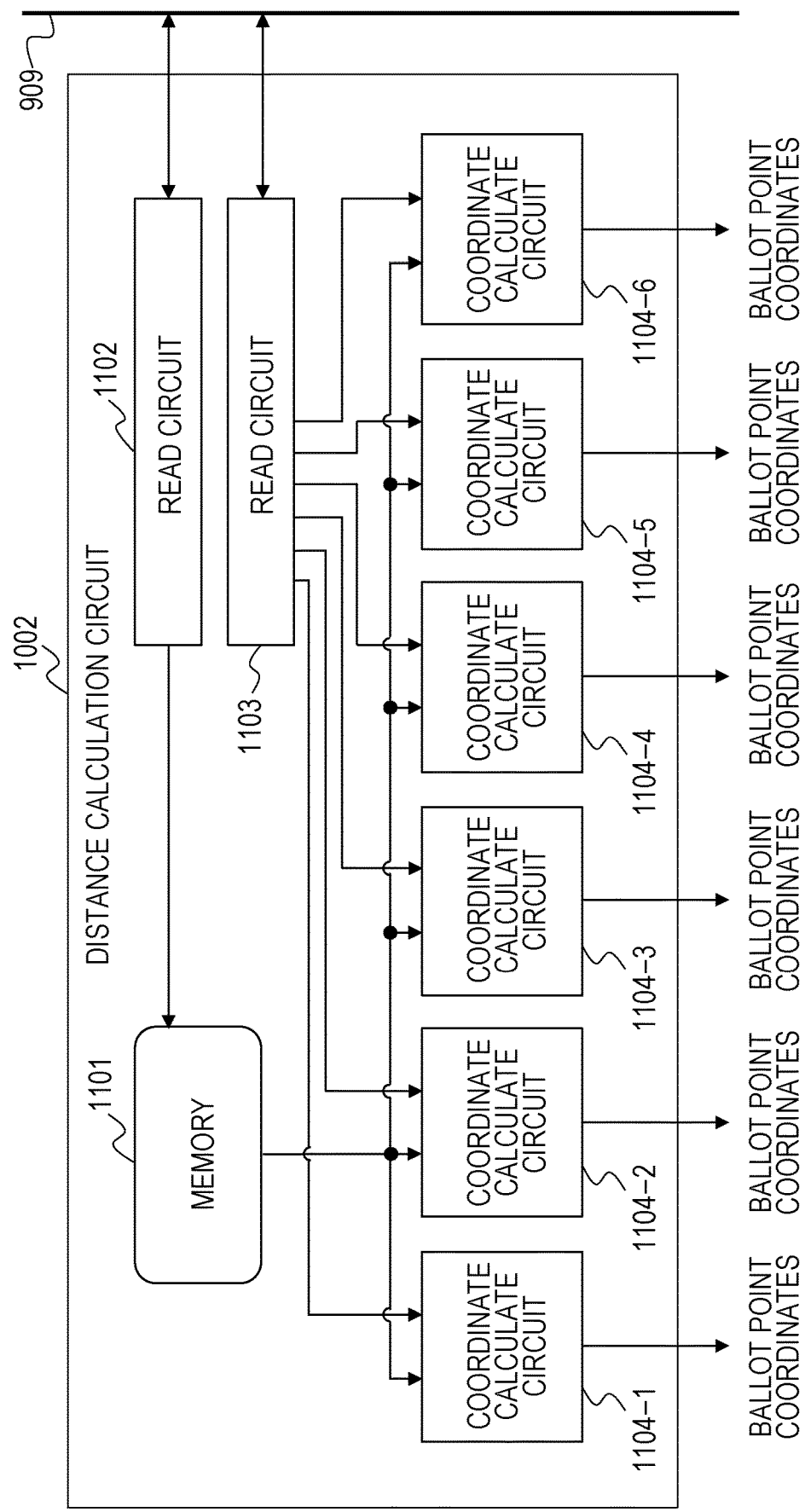
FIG. 11 is a configuration diagram of a distance calculation circuit.

FIG. 11 illustrates an exemplary configuration of the distance calculation circuit 1002 illustrated in FIG. 10. The distance calculation circuit 1002 illustrated in FIG. 11 includes a memory 1101, a read circuit 1102, a read circuit 1103, and coordinate calculation circuits 1104-1 to 1104-6.

The read circuit 1102 reads the coordinates and feature amount of each feature point in a query image from the memory 902 through the bus 909, and stores the read coordinates and feature amount in the memory 1101. The memory 1101 stores the coordinates and feature amounts of all feature points included in one query image.

The read circuit 1103 reads the coordinates and feature amount of each feature point in a DB image from the memory 902 through the bus 909, and outputs the read coordinates and feature amount sequentially to the coordinate calculation circuits 1104-1 to 1104-6. For example, the coordinates of each feature point are expressed in 32 bits, and the feature amount of each feature point is expressed in 128 bits. In this case, a data bus through which the coordinates and feature amounts of four feature points are allowed to be simultaneously forwarded is provided between the memory 1101 and each coordinate calculation circuit 1104-*i* (i=1 to 6).

A bus width BW of this data bus is calculated by an expression below.

$$BW = 32 \text{ bits} \times 4 + 128 \text{ bits} \times 4 = 640 \text{ bits} \quad (11)$$

A data bus through which the coordinates and feature amounts of 16 feature points are allowed to be simultaneously forwarded is provided between the read circuit 1103 and each coordinate calculation circuit 1104-*i*. A bus width BW of this data bus is calculated by an expression below.

$$BW = 32 \text{ bits} \times 16 + 128 \text{ bits} \times 16 = 2560 \text{ bits} \quad (12)$$

The coordinate calculation circuits 1104-1 to 1104-6 calculate the distances between feature points in the DB image and feature points in the query image in parallel. First, the coordinate calculation circuit 1104-*i* reads the coordinates and feature amount of a feature point in the query image from the memory 1101, and receives the coordinates and feature amount of a feature point in the DB image from the read circuit 1103. Subsequently, the coordinate calculation circuit 1104-*i* generates a feature point pair of each feature point in the DB image and a feature point in the query image by scanning all feature points in the query image for the feature point in the DB image to obtain a feature point in the query image, the feature amount of which is at shortest distance. Then, the coordinate calculation circuit 1104-*i* calculates ballot point coordinates from the coordinate difference between the two feature points included in the feature point pair. When having received the coordinates and feature amounts of 16 feature points in the DB image, the coordinate calculation circuit 1104-*i* scans all feature points in the query image, and outputs ballot point coordinates for each of the 16 feature points.

Accordingly, each coordinate calculation circuit 1104-*i* outputs 16 pairs of ballot point coordinates at each coordinate calculation processing, and thus the coordinate calculation circuits 1104-1 to 1104-6 output 96 pairs of ballot point coordinates in total.

Ballot point coordinates are generated for all feature points in the DB image through the coordinate calculation processing repeated a plurality of times by the coordinate calculation circuits 1104-1 to 1104-6. For example, each pair of ballot point coordinates are expressed by Px in Expression (3) and Py in Expression (4), and Px and Py are each expressed in 16 bits. In this case, each pair of ballot point coordinates are expressed in 32 bits, and 16 pairs of ballot point coordinates are expressed in 512 bits.

Figure 12:
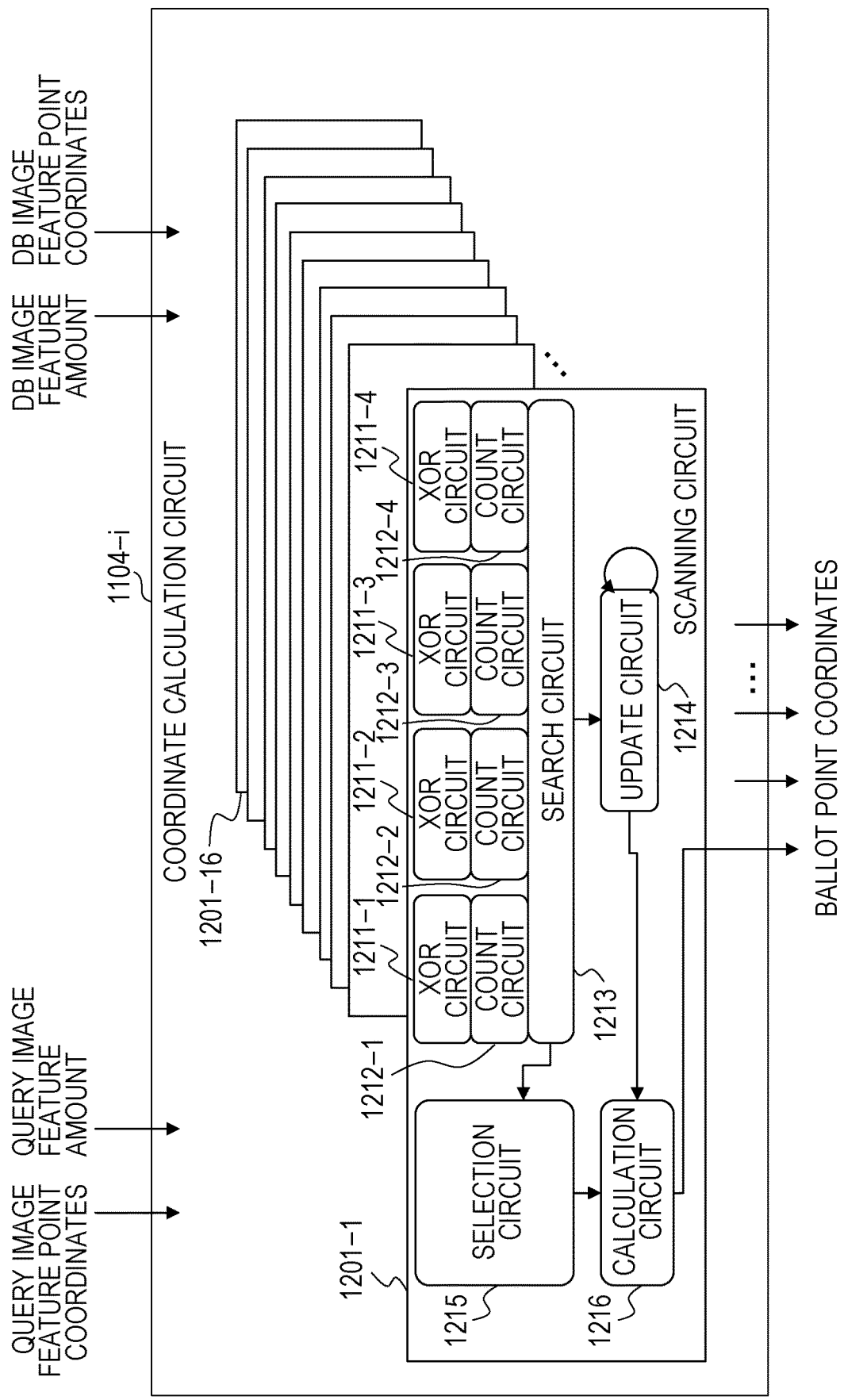
FIG. 12 is a configuration diagram of a coordinate calculation circuit.

FIG. 12 illustrates an exemplary configuration of each coordinate calculation circuit 1104-*i* illustrated in FIG. 11. The coordinate calculation circuit 1104-*i* illustrated in FIG. 12 includes scanning circuits 1201-1 to 1201-16 configured to calculate ballot point coordinates for each of 16 feature points in a DB image. The scanning circuit 1201-*j* (j=1 to 16) scans four feature points in the query image for each feature point in the DB image.

The scanning circuit 1201-*j* includes XOR circuits 1211-1 to 1211-4, count circuits 1212-1 to 1212-4, a search circuit 1213, an update circuit 1214, a selection circuit 1215, and a calculation circuit 1216.

The XOR circuit 1211-*k* (k=1 to 4) calculates the exclusive sum of the feature amount of a feature point in the DB image and the feature amount of a feature point in the query image, and outputs the calculated exclusive sum to the count circuit 1212-*k*. When a feature amount is expressed in 128 bits, the XOR circuit 1211-*k* outputs 128 exclusive sums.

The count circuit 1212-*k* counts the number of bit values indicating logical "1" among the exclusive sums output from the XOR circuit 1211-*k*, and outputs a result of the counting to the search circuit 1213. The counting result represents the Hamming distance between the feature amount of a feature point in the DB image and the feature amount of a feature point in the query image. Each time the count circuits 1212-1 to 1212-4 output counting results, the search circuit 1213 calculates the minimum value of the four counting results and outputs the minimum value to the update circuit 1214.

The search circuit 1213 outputs the minimum value each time the coordinate calculation circuit 1104-*i* receives the coordinates and feature amounts of four feature points in the query image.

The selection circuit 1215 selects the coordinates of a feature point in the query image corresponding to the minimum value output from the search circuit 1213, and outputs the selected coordinates to the calculation circuit 1216.

The update circuit 1214 holds the minimum value output from the search circuit 1213, and compares, each time the search circuit 1213 outputs a new minimum value, the minimum value being held and the new minimum value. When the new minimum value is smaller, the update circuit 1214 rewrites the minimum value being held with the new minimum value. Accordingly, the minimum value being held by the update circuit 1214 is updated each time the coordinate calculation circuit 1104-*i* receives the coordinates and feature amounts of four feature points in the query image.

When the coordinate calculation circuit 1104-*i* has received the coordinates and feature amounts of all feature points in the query image, the calculation circuit 1216 selects the coordinates of a feature point in the query image corresponding to the minimum value being held by the update circuit 1214. Accordingly, a feature point pair of a feature point in the DB image as a processing target of the scanning circuit 1201-*j* and the selected feature point in the query image is generated. Then, the calculation circuit 1216 calculates the ballot point coordinates (Px, Py) by Expressions (3) and (4) by using the coordinates of the two feature points included in the feature point pair.

Figure 13:
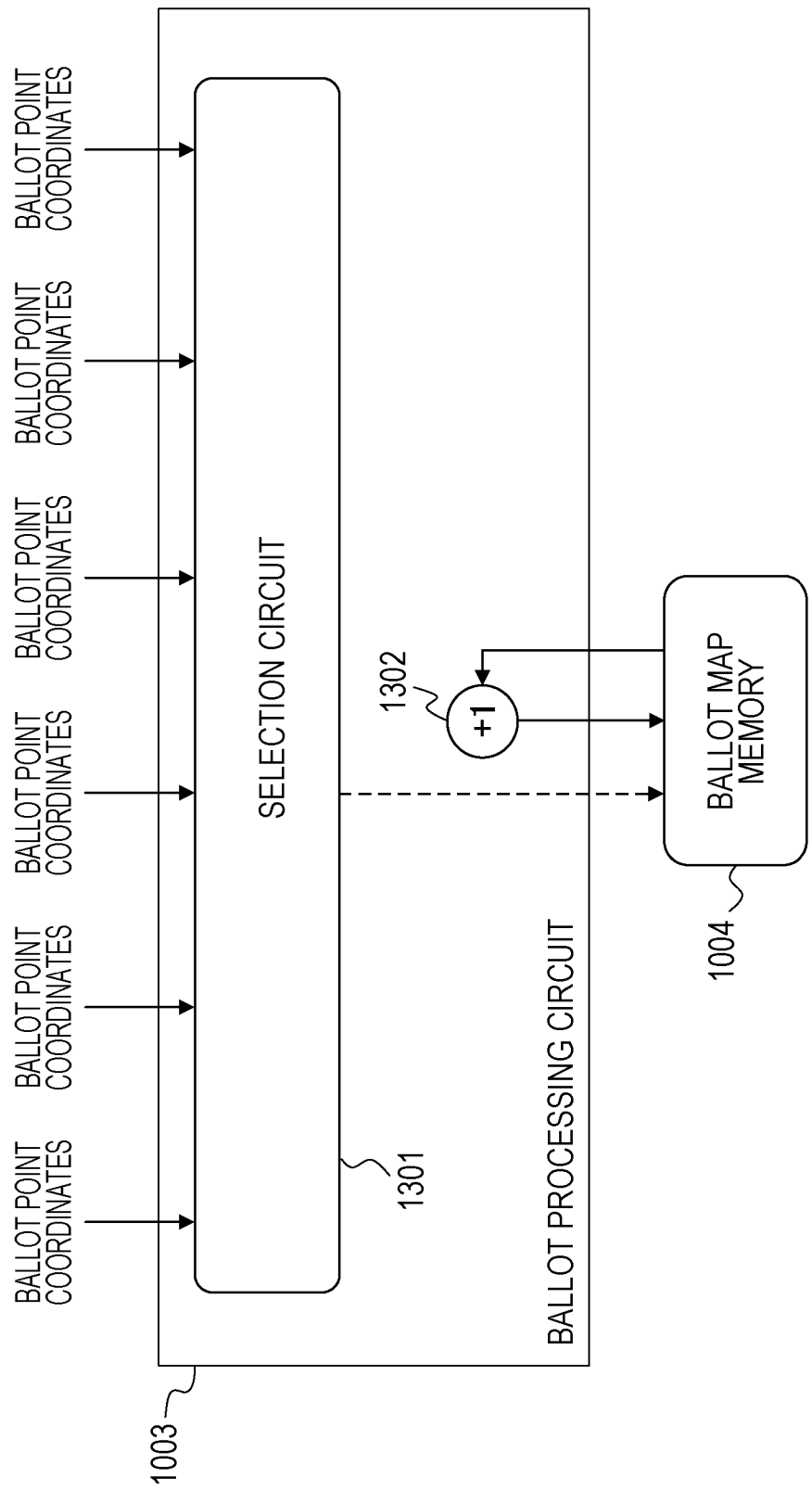
FIG. 13 is a configuration diagram of a ballot processing circuit.

FIG. 13 illustrates an exemplary configuration of the ballot processing circuit 1003 illustrated in FIG. 10.

The ballot processing circuit 1003 illustrated in FIG. 13 includes a selection circuit 1301 and an addition circuit 1302.

The selection circuit 1301 sequentially selects 96 pairs of ballot point coordinates output from the coordinate calculation circuits 1104-1 to 1104-6 of the distance calculation circuit 1002, and outputs the selected pair of ballot point coordinates as an access target address in the ballot map memory 1004.

The addition circuit 1302 reads, from the ballot map memory 1004, a ballot result at the ballot point coordinates selected by the selection circuit 1301, adds one to the read ballot result, and writes a result of the addition to the same ballot point coordinates. Accordingly, at each selection of ballot point coordinates, a ballot result at the ballot point coordinates is incremented by one.

When a certain time has elapsed since the distance calculation circuit 1002 has output the 96 pairs of ballot point coordinates, the distance calculation circuit 1002 outputs next 96 pairs of ballot point coordinates.

Since the coordinate calculation circuit 1104-*i* scans four feature points in the query image each time, a time interval T (in units of the clock cycle of the FPGA 908) at which the distance calculation circuit 1002 outputs ballot point coordinates is calculated by an expression below.

$$T = NQ/4 \quad (13)$$

where NQ represents the number of feature points in the query image.

Thus, when the ballot processing circuit 1003 completes the ballot processing on 96 pairs of ballot point coordinates in the time interval T calculated by Expression (13), no wait time occurs, and thus high hardware processing performance is achieved.

When the distance calculation circuit 1002 outputs ballot point coordinates for all feature points in the DB image, the ballot processing on the ballot point coordinates ends. In this state, the ballot map memory 1004 stores ballot results representing distribution of the coordinate difference between the coordinates of a feature point in the DB image and the coordinates of a feature point in the query image. These ballot results correspond to the first distribution information.

Figure 14:
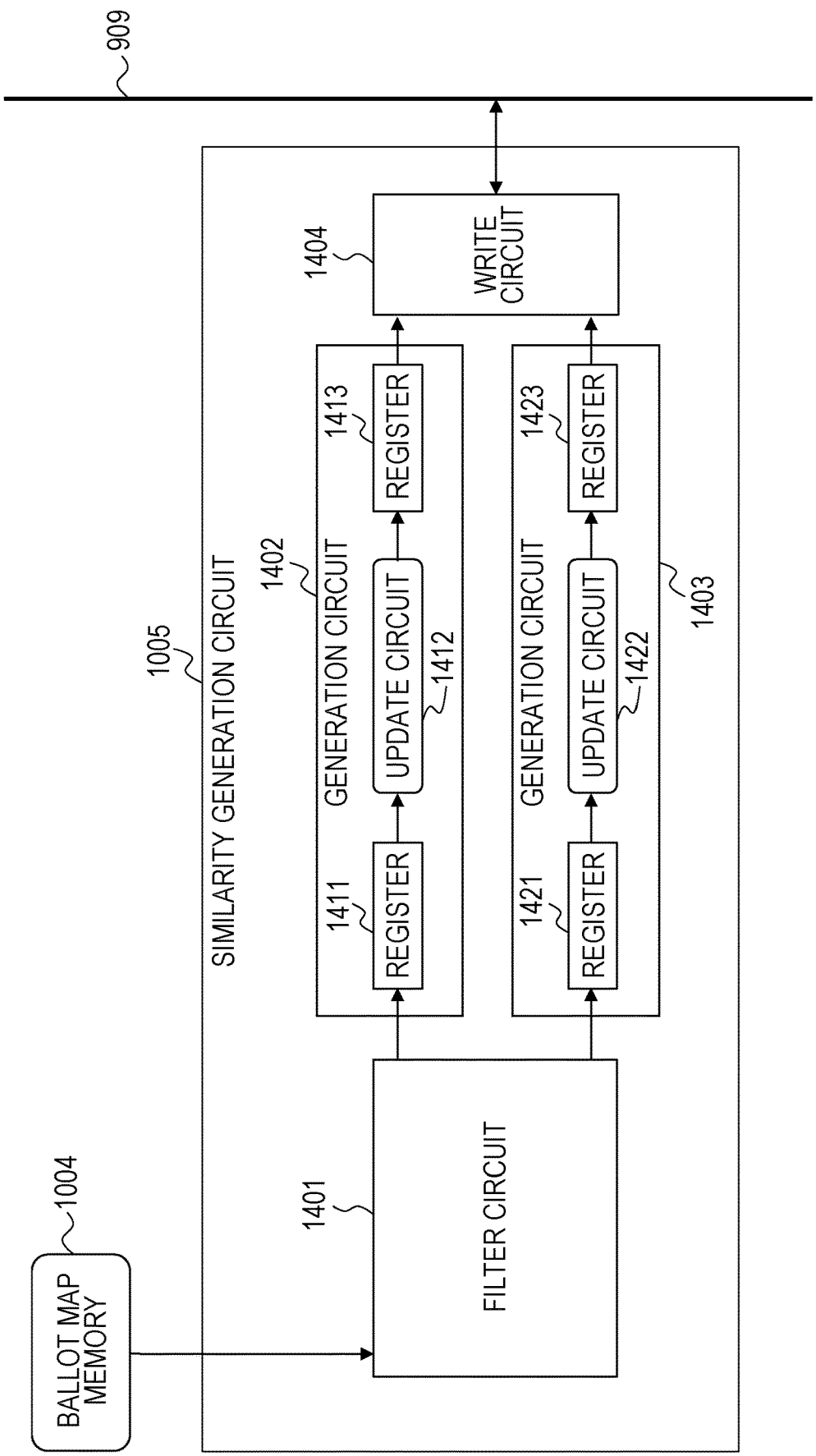
FIG. 14 is a configuration diagram of a similarity generation circuit.

FIG. 14 illustrates an exemplary configuration of the similarity generation circuit 1005 illustrated in FIG. 10. The similarity generation circuit 1005 illustrated in FIG. 14 includes a filter circuit 1401, a generation circuit 1402, a generation circuit 1403, and a write circuit 1404.

The filter circuit 1401 generates a ballot result that allow variation in the difference between the coordinates of a feature point in the DB image and the coordinates of a feature point in the query image by applying an M×M (M is an odd number equal to or larger than three) spatial filter to each ballot result stored in the ballot map memory 1004. Accordingly, for example, a ballot result that allows variation in the shape of an object captured in the DB image and the query image is generated.

The ballot result generated by the filter circuit 1401 corresponds to the second distribution information. Then, the filter circuit 1401 sequentially outputs each ballot result to which the spatial filter is applied to the generation circuit 1402, and sequentially outputs each ballot result to which the spatial filter is not applied to the generation circuit 1403.

The generation circuit 1402 includes a register 1411, an update circuit 1412, and a register 1413, and calculates a similarity MA between the DB image and the query image from each ballot result to which the spatial filter is applied.

The register 1411 stores a ballot result at each pair of ballot point coordinates, and the update circuit 1412 writes the ballot result stored in the register 1411 to the register 1413.

The update circuit 1412 compares a ballot result previously written to the register 1413 and a ballot result stored in the register 1411. When the ballot result stored in the register 1411 is larger, the update circuit 1412 overwrites the ballot result to the register 1413.

Accordingly, the maximum value among all ballot results is written as the similarity MA to the register 1413.

The generation circuit 1403 includes a register 1421, an update circuit 1422, and a register 1423, and calculates a similarity MB between the DB image and the query image from a ballot result to which the spatial filter is not applied.

The register 1421, the update circuit 1422, and the register 1423 operate similarly to the register 1411, the update circuit 1412, and the register 1413 so that the maximum value among all ballot results is written as the similarity MB to the register 1423.

The write circuit 1404 reads the similarity MA and the similarity MB from the register 1413 and the register 1423, respectively, and forwards the similarities MA and MB to the CPU 901.

Figure 15:
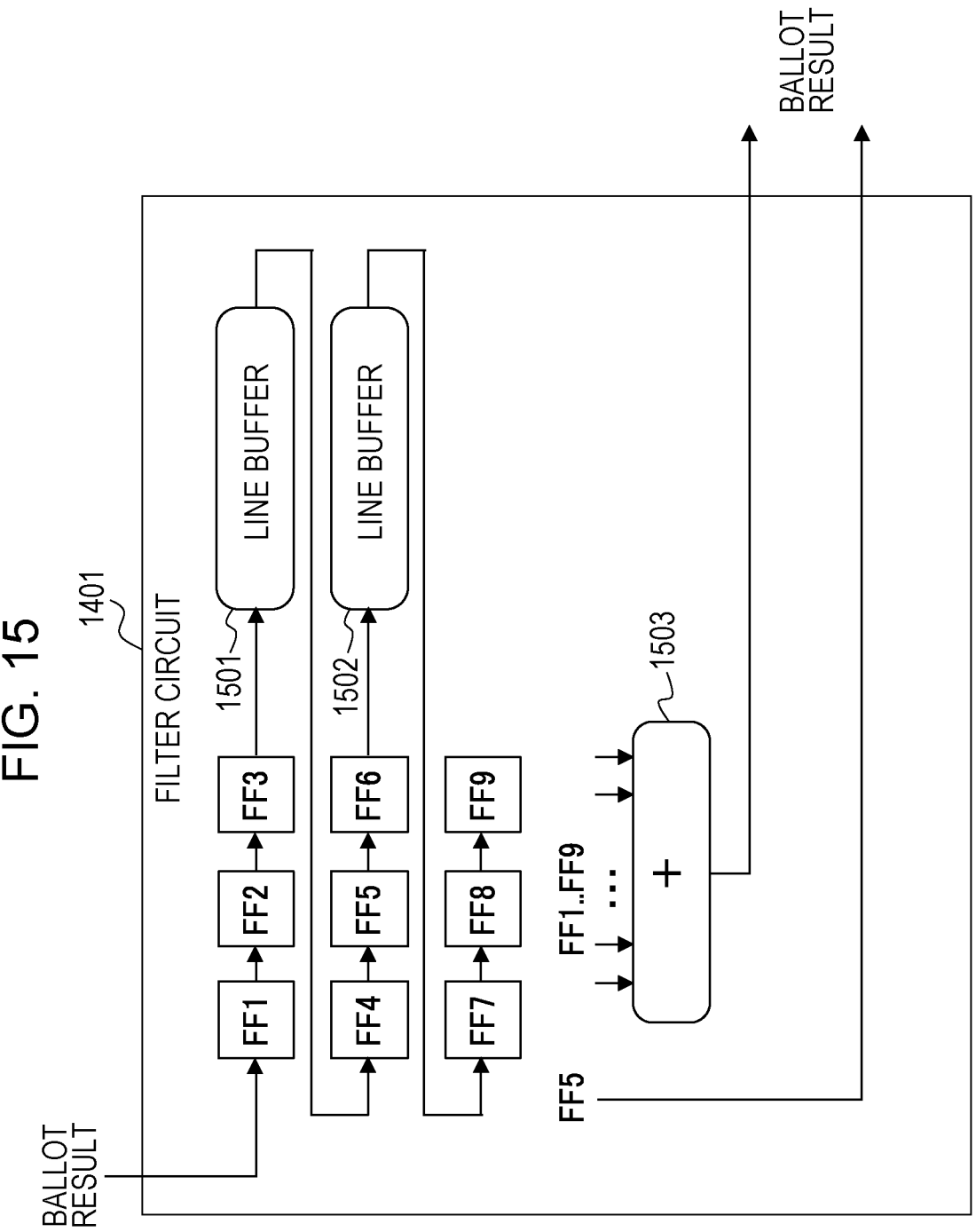
FIG. 15 is a configuration diagram of a filter circuit.

FIG. 15 illustrates an exemplary configuration of the filter circuit 1401 illustrated in FIG. 14.

The filter circuit 1401 illustrated in FIG. 15 includes FFs 1 to 9, a line buffer 1501, a line buffer 1502, and an addition circuit 1503, and performs 3×3 spatial filter calculation. The FFs 1 to 9 are each a flip-flop circuit, and hold a ballot result at each pair of ballot point coordinates stored in the ballot map memory 1004. The FF 1 latches one ballot result output from the ballot map memory 1004, and outputs the ballot result to the FF 2. The FF 2 latches the ballot result output from the FF 1, and outputs the ballot result to the FF 3. The FF 3 latches the ballot result output from the FF 2, and outputs the ballot result to the line buffer 1501. The line buffer 1501 holds "Wm−3" ballot results, and outputs the ballot results one by one to the FF 4.

The width Wm represents the width of the ballot map memory 1004, and is given by Expression (1). The FF 4 latches one ballot result output from the line buffer 1501, and outputs the ballot result to the FF 5. The FF 5 latches the ballot result output from the FF 4, and outputs the ballot result to the FF 6. The FF 6 latches the ballot result output from the FF 5, and outputs the ballot result to the line buffer 1502. The line buffer 1502 holds "Wm−3" ballot results, and outputs the ballot results one by one to the FF 7. The FF 8 latches the ballot result output from the FF 7, and outputs the ballot result to the FF 9.

The FF 9 latches the ballot result output from the FF 8. Accordingly, when the FFs 1 to 3 and the line buffer 1501 hold ballot results on a particular row in the ballot map memory 1004, the FFs 4 to 6 and the line buffer 1502 hold ballot results on a row adjacent to the particular row.

The FFs 1 to 4 and 6 to 9 hold ballot results at eight pairs of ballot point coordinates adjacent to the ballot point coordinates corresponding to a ballot result held by the FF 5. The addition circuit 1503 adds up the nine ballot results held by the FFs 1 to 9 to generate a ballot result by applying a 3×3 spatial filter to the ballot result held by the FF 5. This process obtains ballot results equivalent to those obtained through ballot processing of simultaneously balloting the ballot box 501 and the eight ballot boxes surrounding the ballot box 501 illustrated in FIG. 5B.

Then, the addition circuit 1503 outputs the ballot result indicated by a result of the addition to the generation circuit 1402. In addition, the filter circuit 1401 outputs the ballot result held by the FF 5 directly to the generation circuit 1403. This ballot result corresponds to a ballot result to which the spatial filter is not applied.

The CPU 901 receives the similarities MA and MB to each DB image from the similarity generation circuit 1005, and calculates a similarity score S by performing predetermined calculation using the similarities MA and MB. For example, the CPU 901 may calculate the similarity score S by an expression below.

$$S = MA \times P + MB \times (1-P) \quad (14)$$

In Expression (14), the parameter P is a real number between zero to one inclusive, and indicates allowance for variation in the difference between the coordinates of a feature point in the DB image and the coordinates of a feature point in the query image. A smaller parameter P indicates that variation in the difference is less allowed, and a larger parameter P indicates that variation in the difference is more allowed.

When P=0, S is equal to MB. When P=1, S is equal to MA.

The parameter P may be specified by the user. Then, the CPU 901 determines whether the DB image is similar to the query image based on the similarity score S, and displays a result of the determination on a screen of the output device 904. For example, the CPU 901 determines that the DB image is similar to the query image when the similarity score S is equal to or larger than a threshold, or determines that the DB image is not similar to the query image when the similarity score S is smaller than the threshold.

The CPU 901 may sequentially display a predetermined number of DB images as results of the determination in descending order of the similarity score S.

Figure 16:
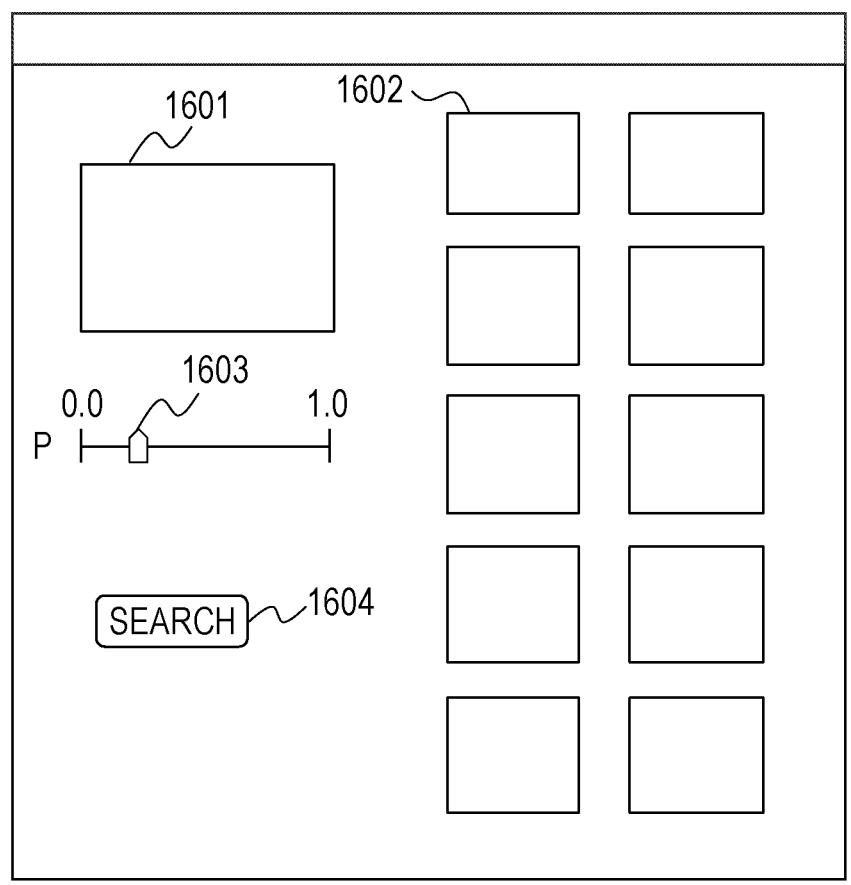
FIG. 16 is a diagram illustrating a determination result display screen.

FIG. 16 illustrates an exemplary display screen of a determination result. The display screen illustrated in FIG. 16 includes a slider 1603 for adjusting the parameter P and a search button 1604. The user specifies a query image 1601, operates the slider 1603 to specify the parameter P, and then clicks the search button 1604. Accordingly, the information processing device 701 performs the matching processing, and displays a predetermined number of DB images 1602 having highest similarity scores S.

The information processing device 701 stores the similarities MA and MB of each DB image in the memory 902. When the parameter P is changed by the user, the information processing device 701 immediately recalculates the similarity score S of the DB image, and updates the display of the DB images 1602. A time taken for the recalculation of the similarity score S is sufficiently short as compared to a time taken for search processing. Thus, it is possible to change to what extent the difference variation is allowed in real time on the determination result display screen by changing the similarity score S based on the parameter P.

Figure 17:
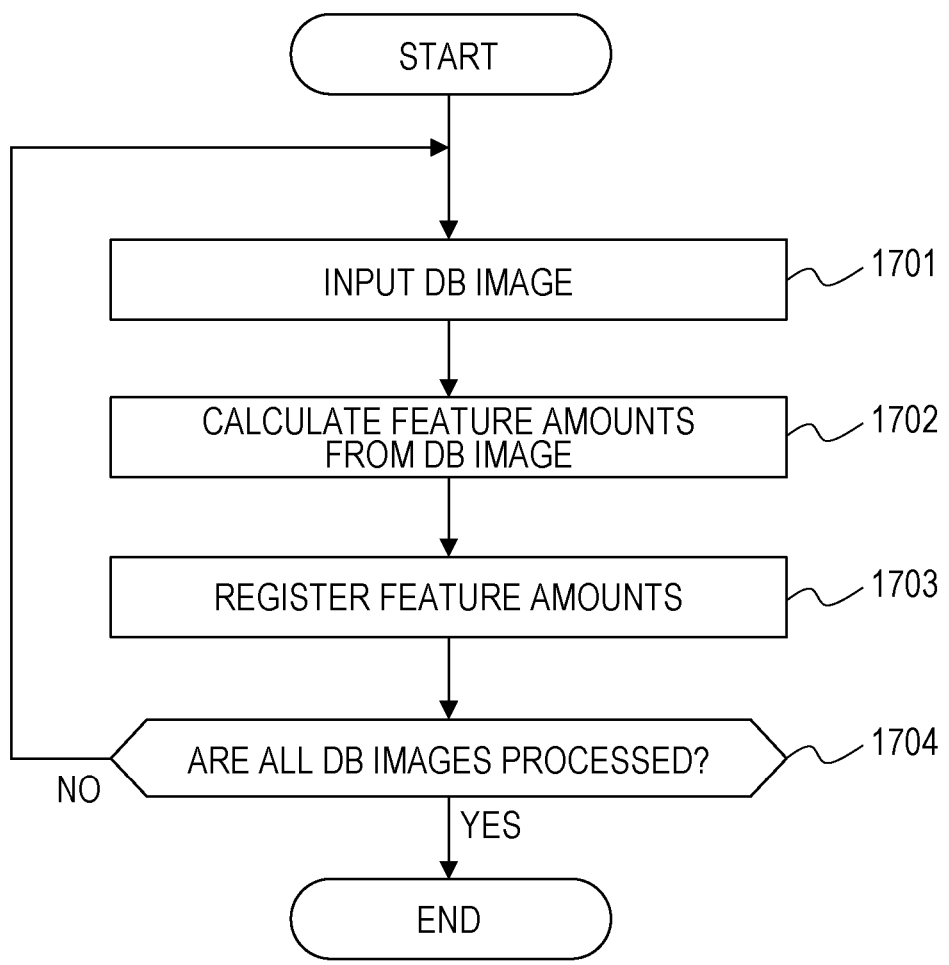
FIG. 17 is a flowchart of registration processing.

FIG. 17 is a flowchart illustrating exemplary registration processing of registering DB images to the information processing device 701 as preparation for the search processing. First, the user inputs a DB image as a registration target to the information processing device 701 (step 1701), and the CPU 901 calculates the feature amount of each feature point in the input DB image (step 1702). Then, the CPU 901 registers the coordinates and feature amount of each feature point to a database in the memory 902 or the auxiliary storage device 905 (step 1703).

Subsequently, the CPU 901 checks whether all DB images as registration targets are processed (step 1704). When there is any unprocessed DB image (NO at step 1704), the CPU 901 repeats the processing starting at step 1701 on the next DB image.

Then, when all DB images are processed (YES at step 1704), the CPU 901 ends the processing.

Figure 18:
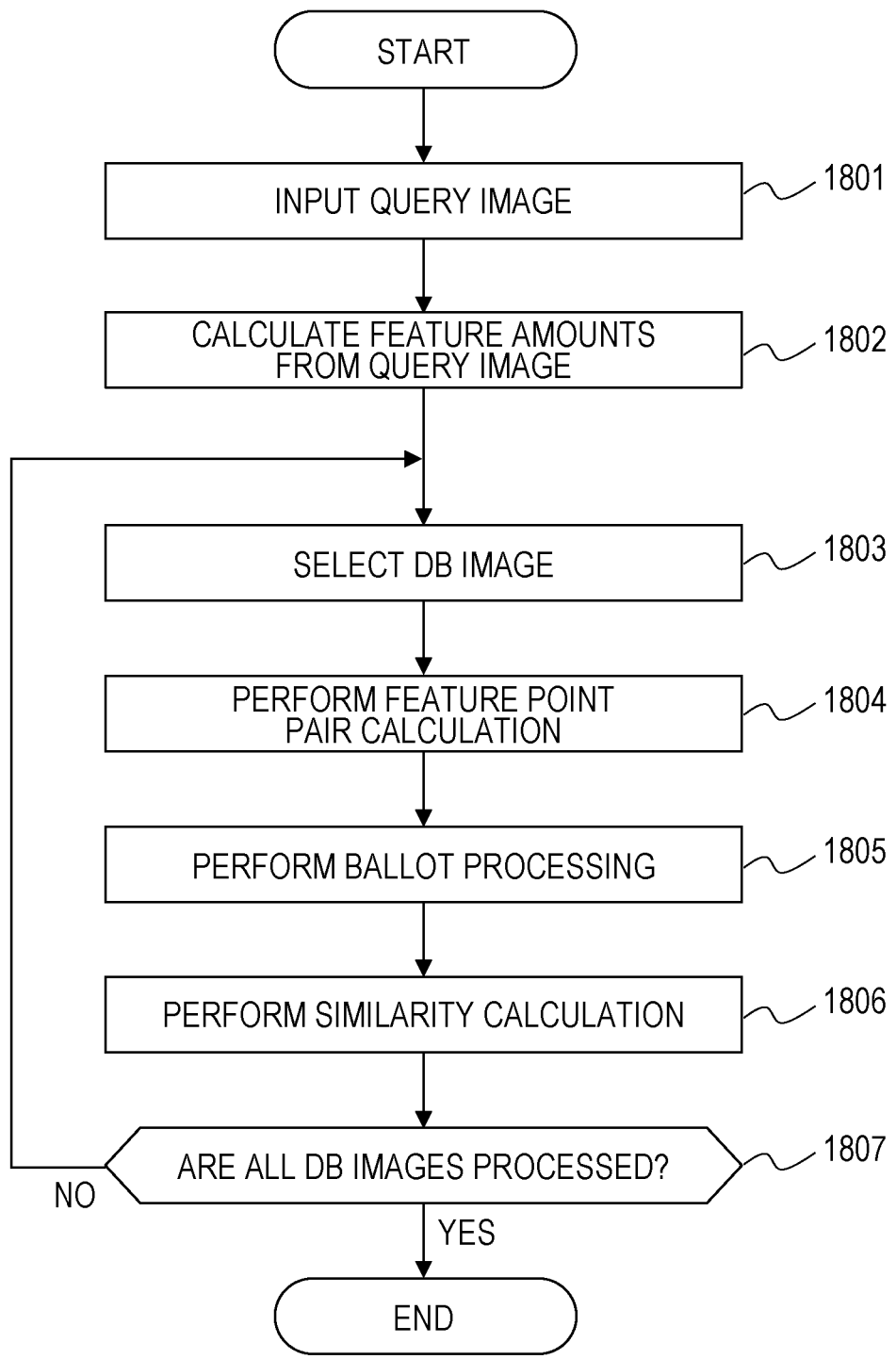
FIG. 18 is a flowchart of search processing.

FIG. 18 is a flowchart illustrating exemplary search processing in the matching processing. First, the user inputs a query image to the information processing device 701 (step 1801), and the CPU 901 calculates the feature amount of each feature point in the input query image (step 1802).

Subsequently, the distance calculation circuit 1002 of the FPGA 908 selects a DB image as a processing target from the database (step 1803), and performs the feature point pair calculation (step 1804).

Then, the ballot processing circuit 1003 performs the ballot processing (step 1805), and the similarity generation circuit 1005 performs the similarity calculation (step 1806).

Subsequently, the distance calculation circuit 1002 checks whether all DB images as processing targets are processed (step 1807). When there is any unprocessed DB image (NO at step 1807), the FPGA 908 repeats the processing starting at step 1803 on the next DB image. Then, when all DB images are processed (YES at step 1807), the FPGA 908 ends the processing.

Figure 19:
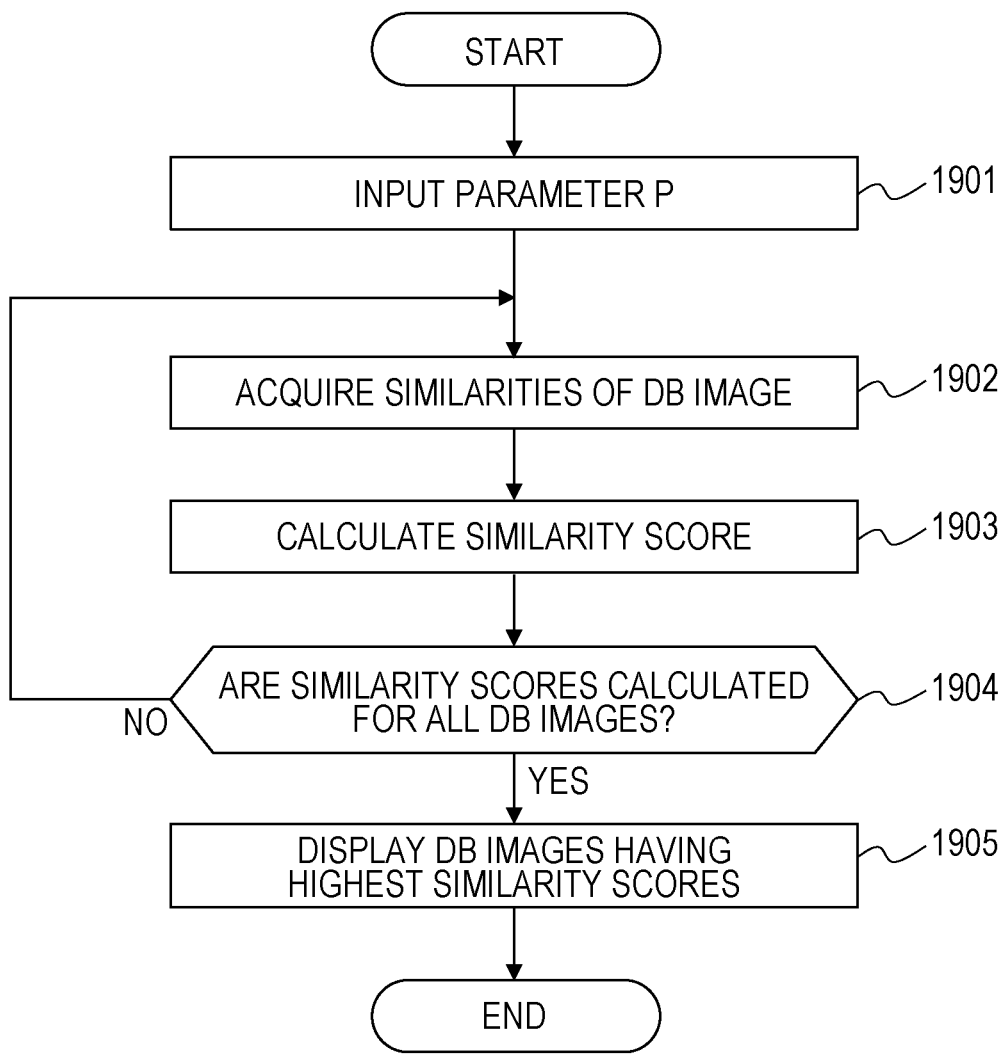
FIG. 19 is a flowchart of determination processing.

FIG. 19 is a flowchart illustrating exemplary determination processing in the matching processing. First, the user inputs the parameter P to the information processing device 701 (step 1901).

Then, the CPU 901 acquires the similarities MA and MB of each DB image calculated by the FPGA 908 (step 1902), and calculates the similarity score S by Expression (14) (step 1903).

Subsequently, the CPU 901 checks whether the similarity scores S are calculated for all DB images (step 1904). When there is any unprocessed DB image (NO at step 1904), the CPU 901 repeats the processing starting at step 1902 on the next DB image. Then, when the similarity scores S are calculated for all DB images (YES at step 1904), the CPU 901 displays a predetermined number of DB images having the highest similarity scores S on the screen (step 1905).

Figure 20:
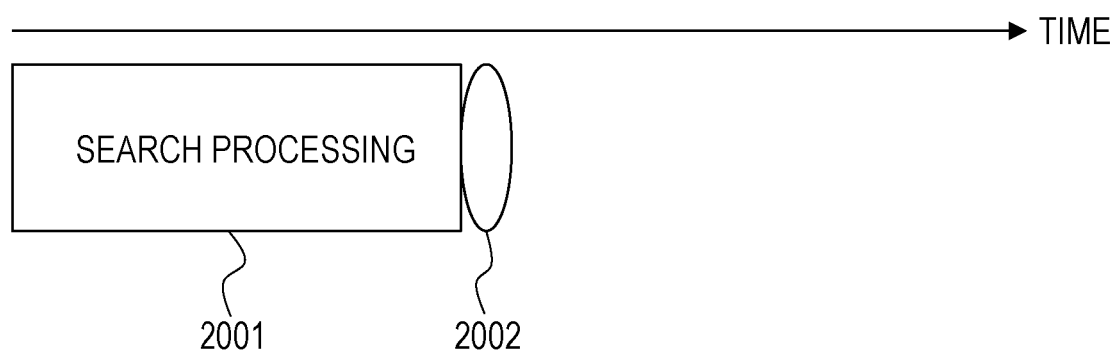
FIG. 20 is a diagram illustrating the processing time of matching processing by using a spatial filter.

FIG. 20 illustrates an exemplary processing time of the matching processing using a spatial filter. The information processing device 701 performs search processing 2001 and then performs determination processing 2002. In the search processing 2001, the search processing illustrated in FIG. 18 is performed. In the determination processing 2002, the determination processing illustrated in FIG. 19 is performed.

In this case, both of the similarity MA, which is calculated by allowing the difference variation, and the similarity MB, which is calculated by not allowing the difference variation, are obtained through single execution of the search processing 2001, and thus the matching processing ends in a processing time less than half of that of the matching processing illustrated in FIG. 6.

In this manner, according to the information processing device 701 illustrated in FIG. 9, the two similarities differently affected by the difference variation are obtained through single execution of the search processing by applying a spatial filter to ballot results, which leads to reduction of the processing time of the matching processing.

The matching processing is further speeded up through execution of the search processing by using the hardware of the FPGA 908. In the FPGA 908 illustrated in FIG. 10, the ballot processing is performed by using the single ballot map memory 1004, but the ballot processing may be speeded up by using a plurality of ballot map memories.

Figure 21:
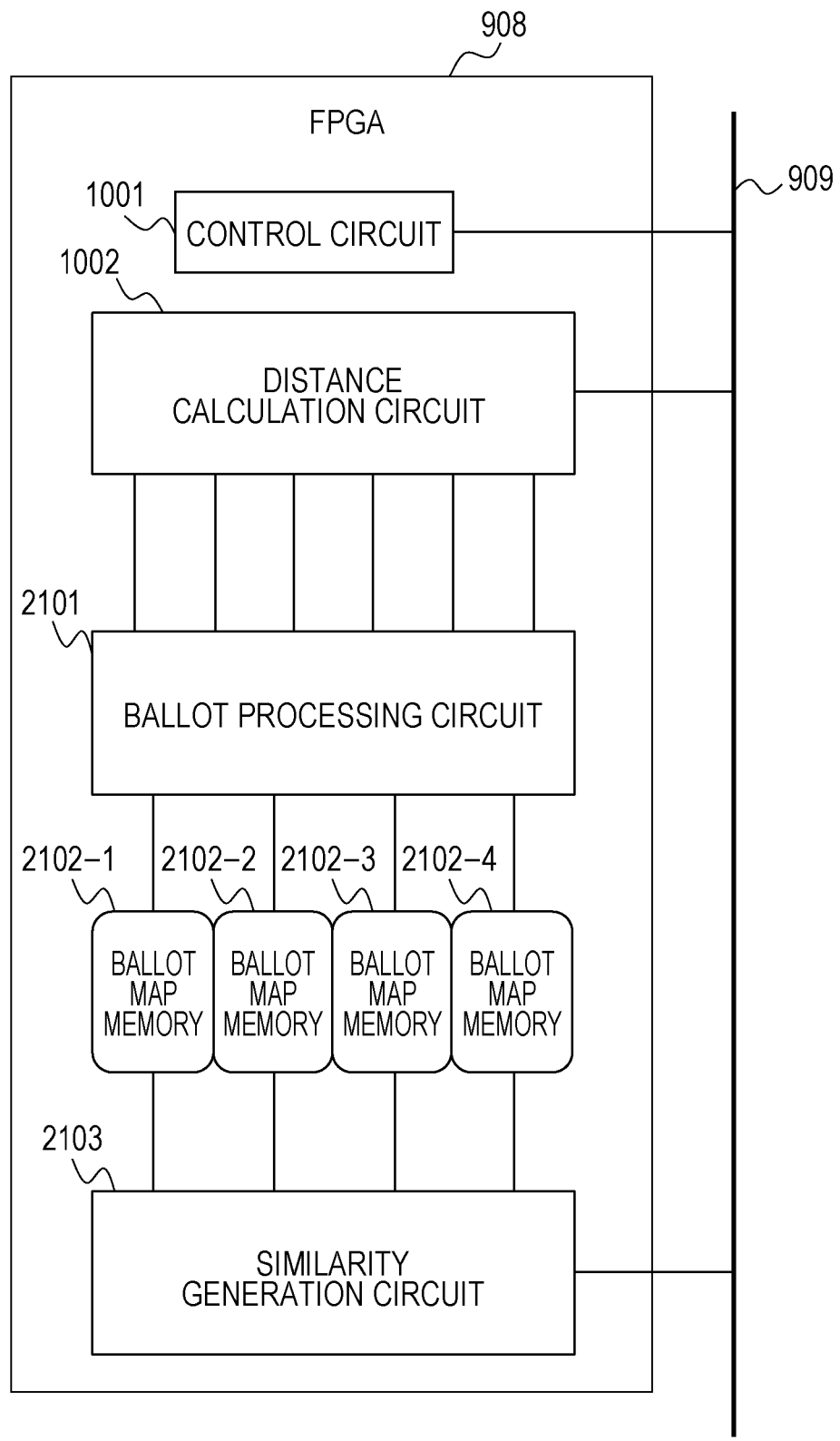
FIG. 21 is a configuration diagram of a FPGA including a plurality of ballot map memories.

FIG. 21 illustrates an exemplary configuration of the FPGA 908 including a plurality of ballot map memories. The FPGA 908 illustrated in FIG. 21 includes the control circuit 1001, the distance calculation circuit 1002, a ballot processing circuit 2101, ballot map memories 2102-1 to 2102-4, and a similarity generation circuit 2103. The ballot processing circuit 2101 and the ballot map memories 2102-1 to 2102-4 correspond to the distribution generator 711, and the similarity generation circuit 2103 corresponds to the similarity generator 712.

The control circuit 1001 and the distance calculation circuit 1002 are operated in a manner same as in a case illustrated in FIG. 9. The ballot processing circuit 2101 performs the ballot processing in parallel by using the ballot map memories 2102-1 to 2102-4. Then, the similarity generation circuit 2103 calculates a plurality of similarities between each DB image and a query image from ballot results stored in the ballot map memories 2102-1 to 2102-4.

The position of a ballot box in the ballot map memories 2102-1 to 2102-4 is represented by ballot point coordinates common to the ballot map memories. Then, the ballot map memories 2102-1 to 2102-4 store ballot results for the same ballot point coordinates in a dispersive manner.

Figure 22:
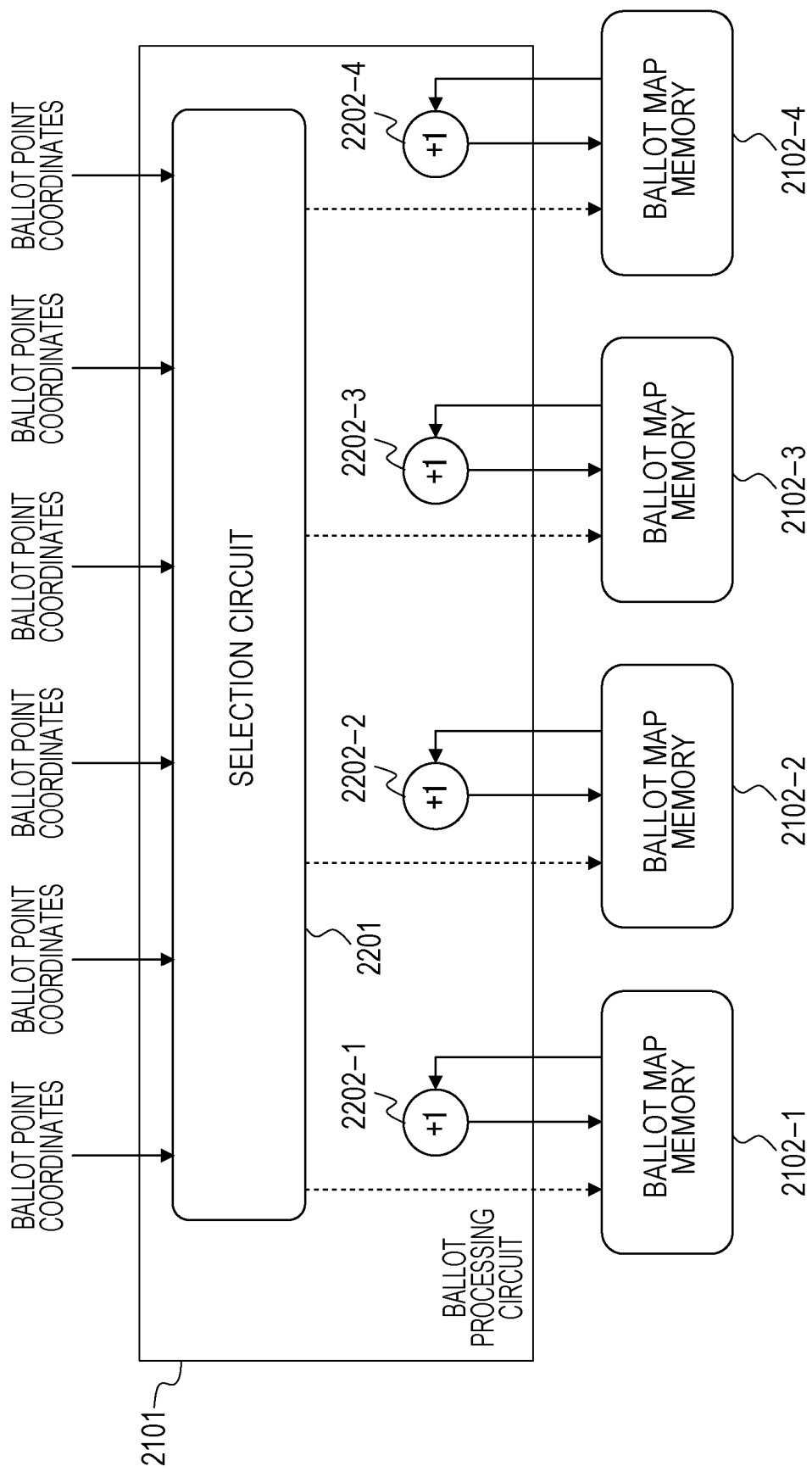
FIG. 22 is a configuration diagram of a ballot processing circuit of the FPGA including a plurality of ballot map memories.

FIG. 22 illustrates an exemplary configuration of the ballot processing circuit 2101 illustrated in FIG. 21. The ballot processing circuit 2101 illustrated in FIG. 22 includes a selection circuit 2201 and addition circuits 2202-1 to 2202-4. The selection circuit 2201 selects four pairs of ballot point coordinates from among 96 pairs of ballot point coordinates output from the coordinate calculation circuits 1104-1 to 1104-6 of the distance calculation circuit 1002.

Then, the selection circuit 2201 outputs the four pairs of ballot point coordinates as access target addresses of the ballot map memories 2102-1 to 2102-4, respectively. The addition circuit 2202-r (r=1 to 4) reads, from the ballot map memory 2102-r, a ballot result at ballot point coordinates selected by the selection circuit 2201, adds one to the read ballot result, and writes a result of the addition to the same ballot point coordinates. The addition circuits 2202-1 to 2202-4 perform this addition processing in parallel.

Then, when the distance calculation circuit 1002 outputs ballot point coordinates for all feature points in the DB image, the ballot processing on the ballot point coordinates ends. In this state, in the ballot map memories 2102-1 to 2102-4 store, in a dispersive manner, ballot results representing distribution of the coordinate difference between the coordinates of a feature point in the DB image and the coordinates of a feature point in the query image.

Figure 23:
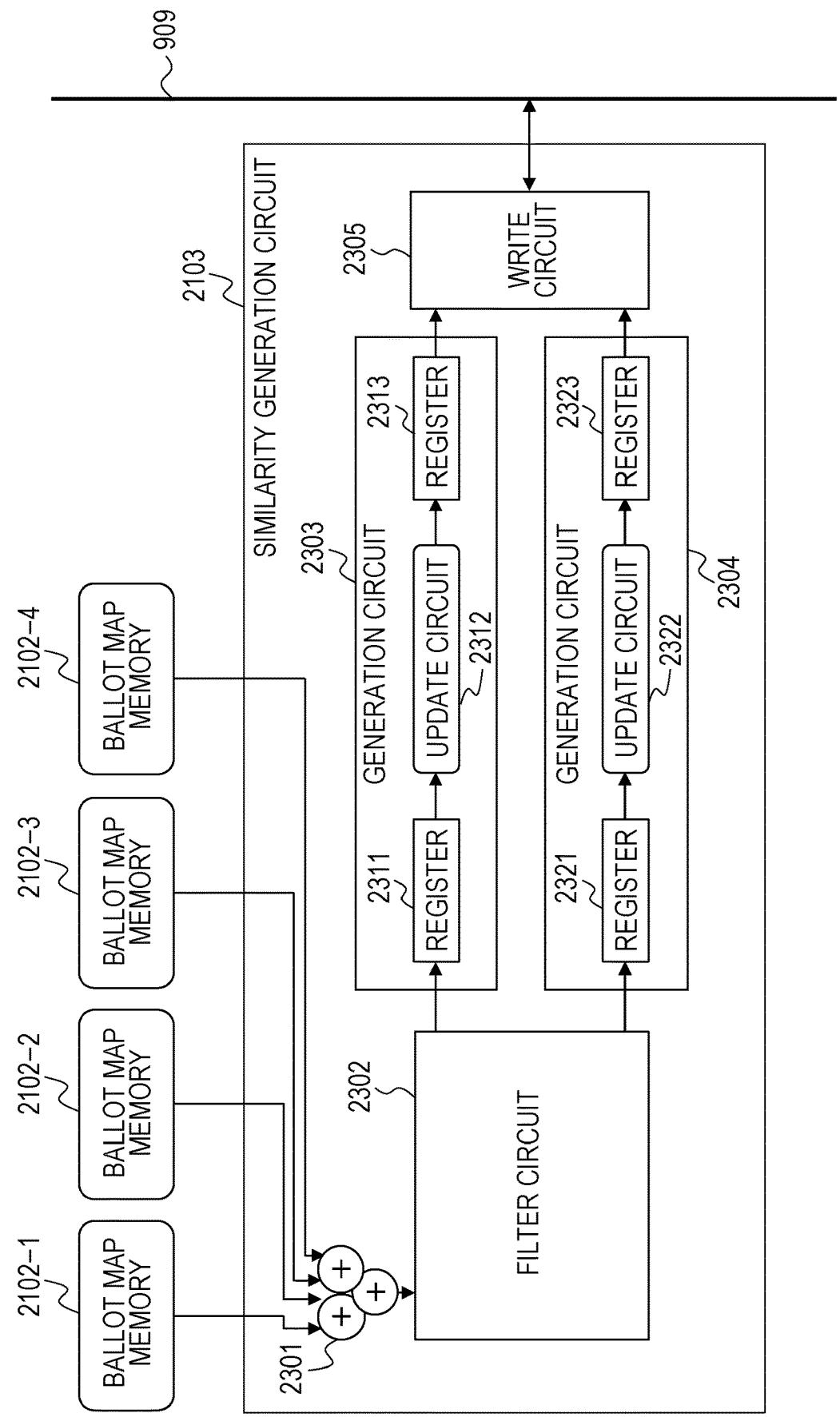
FIG. 23 is a configuration diagram of a similarity generation circuit of the FPGA including a plurality of ballot map memories.

FIG. 23 illustrates an exemplary configuration of the similarity generation circuit 2103 illustrated in FIG. 21. The similarity generation circuit 2103 illustrated in FIG. 23 includes a tally circuit 2301, a filter circuit 2302, a generation circuit 2303, a generation circuit 2304, and a write circuit 2305. The generation circuit 2303 includes a register 2311, an update circuit 2312, and a register 2313. The generation circuit 2304 includes a register 2321, an update circuit 2322, and a register 2323.

The tally circuit 2301 tallies the ballot result at each pair of ballot point coordinates by adding four corresponding ballot results stored in the ballot map memories 2102-1 to 2102-4. Then, the tally circuit 2301 outputs the tallied ballot result to the filter circuit 2302. The operation of the filter circuit 2302, the generation circuit 2303, the generation circuit 2304, and the write circuit 2305 is same as the operation of the filter circuit 1401, the generation circuit 1402, the generation circuit 1403, and the write circuit 1404 illustrated in FIG. 14, respectively.

Figure 24:
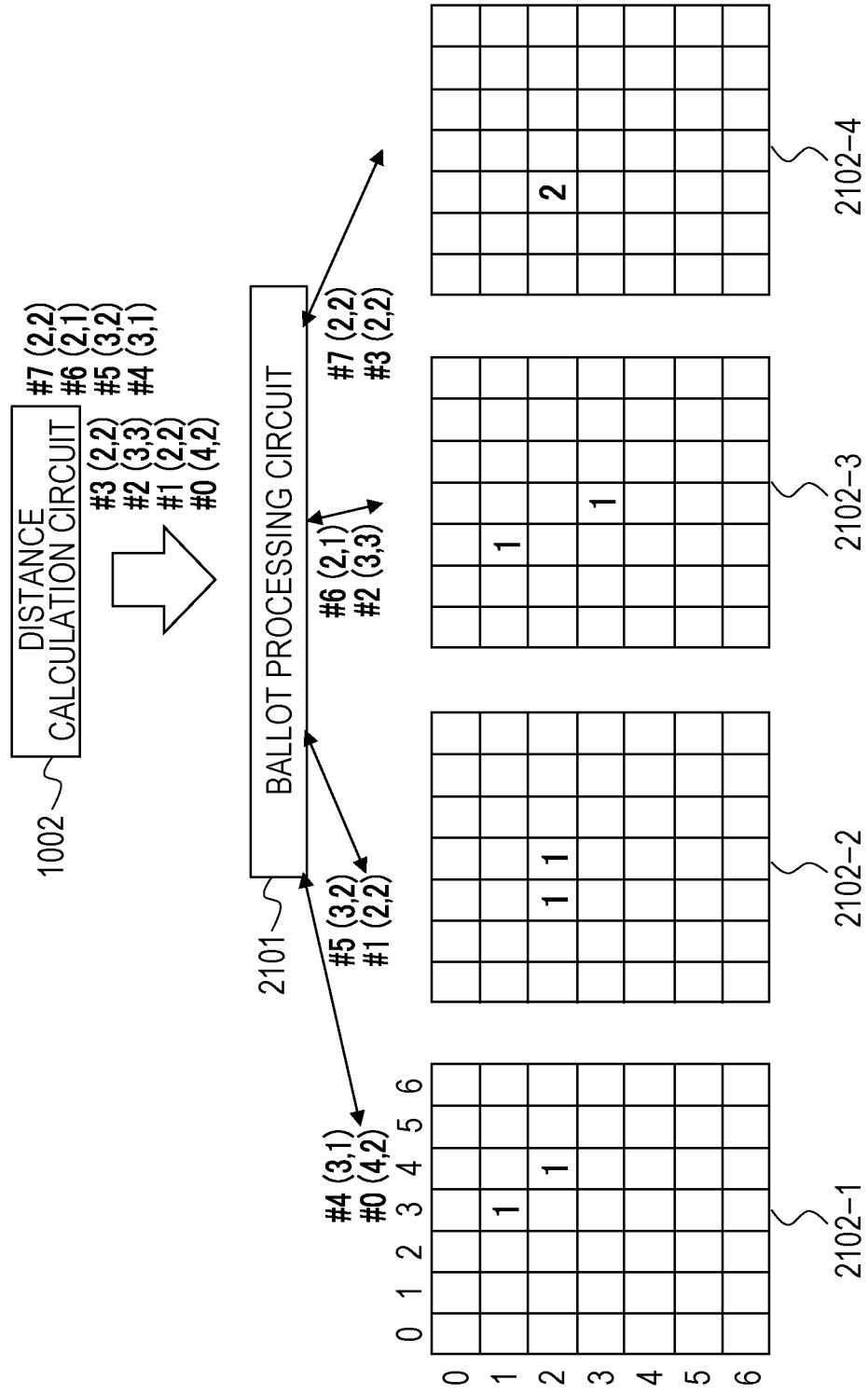
FIG. 24 is a diagram illustrating ballot processing by using the plurality of ballot map memories.

FIG. 24 illustrates exemplary ballot processing performed by the ballot processing circuit 2101 illustrated in FIG. 22. In this example, the q-th (q=0 to 7) ballot point coordinates (Px, Py) output from the distance calculation circuit 1002 is written as #q (Px, Py). For example, when the distance calculation circuit 1002 sequentially outputs eight pairs of zeroth to seventh pairs of ballot point coordinates, the ballot processing circuit 2101 outputs #0 (4, 2) and #4 (3, 1) as access target addresses of the ballot map memory 2102-1.

Accordingly, one is written to the ballot point coordinates (4, 2) and the ballot point coordinates (3, 1) of the ballot map memory 2102-1.

The ballot processing circuit 2101 also outputs #1 (2, 2) and #5 (3, 2) as access target addresses of the ballot map memory 2102-2.

Accordingly, one is written to the ballot point coordinates (2, 2) and the ballot point coordinates (3, 2) of the ballot map memory 2102-2.

The ballot processing circuit 2101 also outputs #2 (3, 3) and #6 (2, 1) as access target addresses of the ballot map memory 2102-3.

Accordingly, one is written to the ballot point coordinates (3, 3) and the ballot point coordinates (2, 1) of the ballot map memory 2102-3.

The ballot processing circuit 2101 also outputs #3 (2, 2) and #7 (2, 2) as access target addresses of the ballot map memory 2102-4.

Accordingly, two is written to the ballot point coordinates (2, 2) of the ballot map memory 2102-4. In this manner, the ballot processing is performed in parallel by using the ballot map memories 2102-1 to 2102-4, and accordingly, is completed at a speed four times as fast as that in the case with the FPGA 908 illustrated in FIG. 10.

Figure 25:
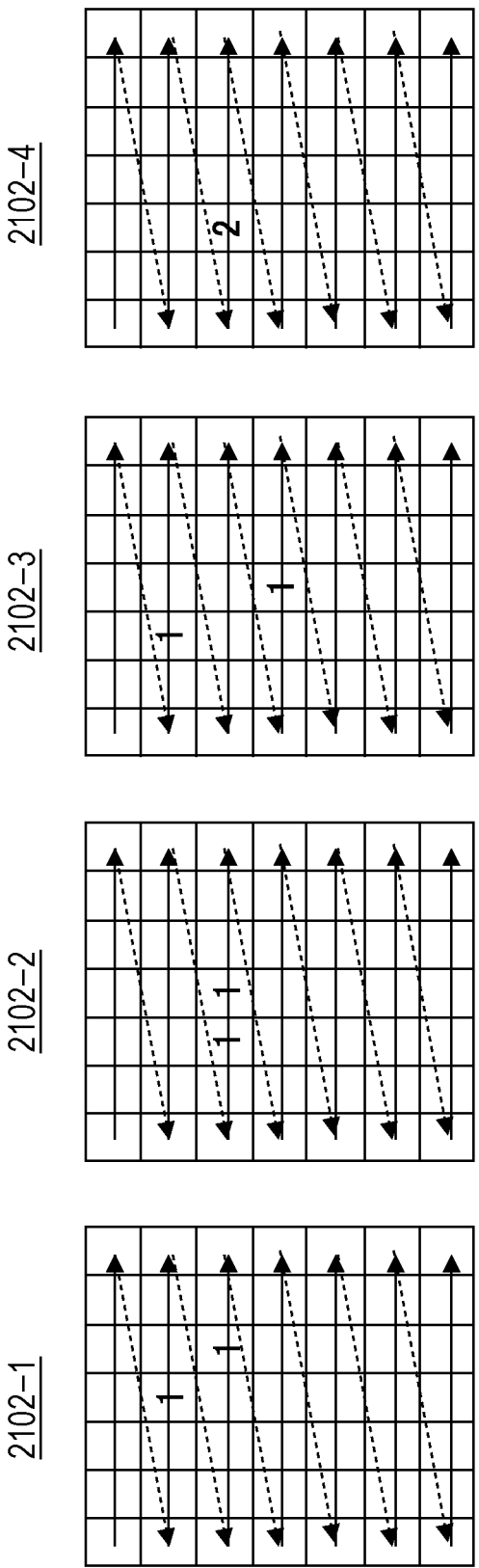
FIG. 25 is a diagram illustrating similarity calculation by using the plurality of ballot map memories.

FIG. 25 illustrates exemplary similarity calculation performed by the similarity generation circuit 2103 illustrated in FIG. 23.

In this example, ballot results are simultaneously read from the ballot map memories 2102-1 to 2102-4 in a raster scanning order, and the tally circuit 2301 adds four ballot results at the same ballot point coordinates. Then, the similarity calculation is performed based on the sum of the ballot results.

The filter circuit 1401 illustrated in FIG. 15 generates a ballot result to which a single spatial filter is applied by performing the 3×3 spatial filter calculation. However, the filter circuit 1401 is capable of generating a plurality of ballot results to which a plurality of spatial filters are applied.

FIG. 26 illustrates an exemplary configuration of the filter circuit 1401 including a plurality of spatial filters. The filter circuit 1401 illustrated in FIG. 26 includes FFs 1 to 25, line buffers 2601 to 2604, an addition circuit 2605, and an addition circuit 2606, and performs 3×3 spatial filter calculation and 5×5 spatial filter calculation. The FFs 1 to 25 are each a flip-flop circuit holding a ballot result at each pair of ballot point coordinates stored in the ballot map memory 1004. The line buffers 2601 to 2604 each hold "Wm−5" ballot results.

The operation of the FFs 1 to 25 and the operation of the line buffers 2601 to 2604 are same as the operation of the FFs 1 to 9 and the operation of the line buffer 1501 and the line buffer 1502 illustrated in FIG. 15, respectively. For example, when the FFs 1 to 5 and the line buffer 2601 hold ballot results on a particular row R1 of the ballot map memory 1004, the FFs 6 to 10 and the line buffer 2602 hold ballot results on a row R2 adjacent to the row R1.

In this state, the FFs 11 to 15 and the line buffer 2603 hold ballot results on a row R3 adjacent to the row R2, and the FFs 16 to 20 and the line buffer 2604 hold ballot results on a row R4 adjacent to the row R3. The FFs 1 to 25 hold 25 ballot results in a 5×5 region centered at the ballot point coordinates corresponding to a ballot result held by the FF 13. The addition circuit 2606 adds the 25 ballot results held by the FFs 1 to 25 to generate a ballot result by applying a 5×5 spatial filter to the ballot result held by the FF 13. Then, the addition circuit 2606 outputs the ballot result indicated by a result of the addition to the generation circuit 1402.

The addition circuit 2605 adds the nine ballot results held by the FFs 7 to 9, 12 to 14, and 17 to 19. Accordingly, similarly to the addition circuit 1503 illustrated in FIG. 15, the addition circuit 2605 generates a ballot result by applying a 3×3 spatial filter to the ballot result held by the FF 13. Then, the addition circuit 2605 outputs the ballot result indicated by a result of the addition to the generation circuit 1403. Accordingly, the filter circuit 1401 illustrated in FIG. 26 generates ballot results obtained by applying 3×3 and 5×5 spatial filters of two kinds. In this case, the similarity generation circuit 1005 calculates the similarities MA and MB, which are differently affected by the difference variation, from the ballot results obtained by applying the two kinds of spatial filters.

The filter circuit 1401 may generate ballot results obtained by applying three kinds or more of spatial filters. In this case, the similarity generation circuit 1005 calculates three kinds or more of similarities differently affected by the difference variation from the ballot results obtained by applying the three kinds or more of spatial filters, and the CPU 901 calculates the similarity score S by using the similarities. Similarly, the filter circuit 2302 illustrated in FIG. 23 may generate ballot results obtained by applying a plurality of spatial filters.

The information processing device 701 may use, as the feature amount of a feature point in each of a DB image and a query image, BRIEF or any local feature amount. For example, the information processing device 701 may use, in place of the BRIEF, local feature amounts as described below.

(1) Scale-Invariant Feature Transform (SIFT)
(2) Speeded Up Robust Features (SURF)
(3) Oriented FAST and Rotated BRIEF (ORB)
(4) Fast Retina Keypoint (FREAK)

All pieces of processing performed by the FPGA 908 may be performed instead by the CPU 901 executing programs. In this case, the memory 902 is used as the ballot map memory 1004 and the ballot map memories 2102-1 to 2102-4 so that the FPGA 908 may be omitted from the information processing device 701. The configuration of the information processing device 701 illustrated in FIGS. 7 and 9 is merely exemplary, and thus may be partially omitted or changed in accordance with the usage or condition of the information processing device 701.

For example, the medium drive device 906 or the network connection device 907 may be omitted when the portable recording medium 910 illustrated in FIG. 9 or the communication network is not used. Any other logical operation circuit such as an application specific integrated circuit (ASIC) may be used in place of the FPGA 908 to perform the feature point pair calculation, the ballot processing, and the similarity calculation.

The configurations of the FPGA 908 illustrated in FIGS. 10 and 21, the distance calculation circuit 1002 illustrated in FIG. 11, the coordinate calculation circuit 1104-$i$ illustrated in FIG. 12, the ballot processing circuit 1003 illustrated in FIG. 13, and the similarity generation circuit 1005 illustrated in FIG. 14 are merely exemplary. The configurations of the filter circuit 1401 illustrated in FIGS. 15 and 26, the ballot processing circuit 2101 illustrated in FIG. 22, and the similarity generation circuit 2103 illustrated in FIG. 23 are merely exemplary.

The configurations of these circuits may be partially omitted or changed in accordance with the usage or condition of the information processing device 701. For example, in the distance calculation circuit 1002, the number of coordinate calculation circuits 1104-$i$ illustrated in FIG. 11 may be any number other than six. In each coordinate calculation circuit 1104-$i$ illustrated in FIG. 12, the number of scanning circuits 1201-$j$ may be any number other than 16, and the number of XOR circuits 1211-$k$ and the number of count circuits 1212-$k$ may be each any number other than four.

The scanning circuit 1201-$j$ may calculate a feature point pair based on any index other than the Hamming distance between feature amounts.

In the filter circuit 1401 illustrated in FIGS. 15 and 26, any spatial filter other than 3×3 and 5×5 spatial filters may be provided. The flowcharts illustrated in FIGS. 8 and 17 to 19 are merely exemplary, and the processing thereof may be partially omitted or changed in accordance with the configuration or condition of the information processing device 701. For example, at step 1905 illustrated in FIG. 19, instead of displaying a predetermined number of DB images having highest similarity scores S, the CPU 901 may display a result of determination based on comparison between each similarity score S and a threshold.

The matching processing illustrated in FIG. 1, the feature point pair calculation illustrated in FIG. 2, the binary feature amount illustrated in FIG. 3, the ballot results illustrated in FIGS. 4A to 5B, the ballot processing illustrated in FIG. 24, and the similarity calculation illustrated in FIG. 25 are merely exemplary. The processing and information thereof change in accordance with DB and query images. The processing time illustrated in FIGS. 6 and 20 is merely exemplary and changes in accordance with DB and query images.

The display screen illustrated in FIG. 16 is merely exemplary, and the CPU 901 may display a determination result in any other format. Expressions (1) to (14) are merely exemplary, and the information processing device 701 may use any other formulae to calculate the width Wm and height Hm of a ballot map memory, the ballot point coordinates (Px, Py), the similarity score S, and the like.

Embodiments and advantages of the disclosure are described above in detail, but may be provided with various kinds of change, addition, and omission by the skilled person in the art without departing from the scope of claims clearly recited in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
a memory; and
a processor coupled to the memory, the processor configured to
determine a combination of each of a plurality of regions in a first image and a corresponding one of a plurality of regions in a second image based on feature amounts, represented by a string of bits, of the regions in the first image and feature amounts of the regions in the second image, and generate first distribution information indicating distribution of the difference between a position of a first region in the first image and a position of a second region in the second image that are included in each of the combinations;
generate second distribution information indicating distribution of the difference between the position of the first region and the position of the second region by applying a spatial filter to the first distribution information, calculate a first similarity between the first image and the second image based on the first distribution information, and calculate a second similarity between the first image and the second image based on the second distribution information; and
generate a comparison result by comparing the first image and the second image based on the first similarity and the second similarity.

2. The information processing device of claim 1, wherein the processor is further configured to
store in the memory, as the first distribution information, the number of combinations each having a difference belonging to each of a plurality of difference ranges,
increment, at each generation of the difference between the position of the first region and the position of the second region, the number of combinations corresponding to a difference range to which the generated difference belongs among the difference ranges,
calculate the first similarity based on a maximum value of the number of combinations corresponding to each difference range,
add up the number of combinations corresponding to each of the difference ranges and the numbers of combinations corresponding to the difference ranges adjacent to the difference range, and output a result of the addition as the second distribution information; and
calculate the second similarity based on a maximum value of the number of combinations output from the filter circuit.

3. The information processing device of claim 1, wherein the the processor is further configured to
store, as the first distribution information, the numbers of combinations each having a difference belonging to each of a plurality of difference ranges,
increment, at each generation of the difference between the position of the first region and the position of the second region, the number of combinations corresponding to a difference range to which the generated difference belongs among the difference ranges,
calculate a sum of the numbers of combinations stored in the memories for each difference range,
calculate a maximum value of the number of combinations corresponding to each difference range based on the sum of the numbers of combinations calculated by the tally circuit, and calculate the first similarity based on the maximum value,
add up the number of combinations corresponding to each difference range and the numbers of combinations corresponding to the difference ranges adjacent to the difference range based on the sum of the numbers of combinations calculated by the tally circuit, and output a result of the addition as the second distribution information, and
calculate the second similarity based on a maximum value of the number of combinations output from the filter circuit.

4. The information processing device of claim 1, wherein the processor calculates a third similarity between the first image and the second image by performing predetermined calculation using the first similarity and the second similarity, and generates the comparison result based on the third similarity.

5. An information processing device comprising:
a memory; and
a processor coupled to the memory, the processor configured to
determine a combination of each of a plurality of regions in a first image and a corresponding one of a plurality of regions in a second image based on feature amounts, represented by a string of bits, of the regions in the first image and feature amounts of the regions in the second image, and generate first distribution information indicating distribution of the difference between a position of a first region in the first image and a position of a second region in the second image that are included in each of the combinations;
generate second distribution information indicating distribution of the difference between the position of the first region and the position of the second region by applying a first spatial filter to the first distribution information, generate third distribution information indicating distribution of the difference between the position of the first region and the position of the second region by applying a second spatial filter to the first distribution information, calculate a first similarity between the first image and the second image based on the second distribution information, and calculate a second similarity between the first image and the second image based on the third distribution information; and
generate a comparison result by comparing the first image and the second image based on the first similarity and the second similarity.

6. The information processing device of claim 5, wherein the processor is further configured to
store in the memory, as the first distribution information, the number of combinations each having a difference belonging to each of a plurality of difference ranges,
increment, at each generation of the difference between the position of the first region and the position of the second region, the number of combinations corresponding to a difference range to which the generated difference belongs among the difference ranges,
add up the number of combinations corresponding to each difference range, the numbers of combinations corresponding to first difference ranges adjacent to the difference range, and the numbers of combinations corresponding to second difference ranges adjacent to the first difference ranges, output a result of the addition as the second distribution information, add up the number of combinations corresponding to the difference range and the numbers of combinations corresponding to the first difference ranges, and output a result of the addition as the third distribution information,
calculate the first similarity based on a maximum value of the number of combinations indicated by the second distribution information, and
to calculate the second similarity based on a maximum value of the number of combinations indicated by the third distribution information.

7. The information processing device of claim 5, wherein the processor is further configured to
store, as the first distribution information, the numbers of combinations each having a difference belonging to each of a plurality of difference ranges,
increment, at each generation of the difference between the position of the first region and the position of the second region, the number of combinations corresponding to a difference range to which the generated difference belongs among the difference ranges,
calculate a sum of the numbers of combinations stored in the memories for each difference range,
add up the number of combinations corresponding to each difference range, the numbers of combinations corresponding to first difference ranges adjacent to the difference range, and the numbers of combinations corresponding to second difference ranges adjacent to the first difference ranges based on the sum of the numbers of combinations calculated by the tally circuit, output a result of the addition as the second distribution information, add up the number of combinations corresponding to the difference range and the numbers of combinations corresponding to the first difference ranges, and output a result of the addition as the third distribution information,
calculate the first similarity based on a maximum value of the number of combinations indicated by the second distribution information, and
calculate the second similarity based on a maximum value of the number of combinations indicated by the third distribution information.

8. The information processing device of claim 5, wherein the processor calculates a third similarity between the first image and the second image by performing predetermined calculation using the first similarity and the second similarity, and generates the comparison result based on the third similarity.

9. An information processing method executed by an information processing device, the method comprising:
determining a combination of each of a plurality of regions in a first image and a corresponding one of a plurality of regions in a second image based on feature amounts, represented by a string of bits, of the regions in the first image and feature amounts of the regions in the second image;
generating first distribution information indicating distribution of the difference between a position of a first region in the first image and a position of a second region in the second image that are included in each of the combinations;
generating second distribution information indicating distribution of the difference between the position of the first region and the position of the second region by applying a spatial filter to the first distribution information;
calculating a first similarity between the first image and the second image based on the first distribution information;
calculating a second similarity between the first image and the second image based on the second distribution information; and
generating a comparison result by comparing the first image and the second image based on the first similarity and the second similarity.

10. The information processing method of claim 9, wherein the method further comprises:
storing, as the first distribution information, the number of combinations each having a difference belonging to each of a plurality of difference ranges;
incrementing at each generation of the difference between the position of the first region and the position of the second region, the number of combinations corresponding to a difference range to which the generated difference belongs among the difference ranges;
calculating the first similarity based on a maximum value of the number of combinations corresponding to each difference range;
generating the second distribution information by adding up the number of combinations corresponding to each difference range and the numbers of combinations corresponding to the difference ranges adjacent to the difference range; and
calculating the second similarity based on a maximum value of the number of combinations indicated by the second distribution information.

11. The information processing method of claim 9, wherein the method further comprises:
store, as the first distribution information, the numbers of combinations each having a difference belonging to each of a plurality of difference ranges;
incrementing, at each generation of the difference between the position of the first region and the position of the second region, the number of combinations corresponding to a difference range to which the generated difference belongs among the difference ranges;
calculating a sum of the numbers of combinations stored in the memories for each difference range;
calculating a maximum value of the number of combinations corresponding to each difference range based on the calculated sum of the numbers of combinations;
calculating the first similarity based on the maximum value;
generating the second distribution information by adding up the number of combinations corresponding to each difference range and the numbers of combinations corresponding to the difference ranges adjacent to the difference range based on the calculated sum of the numbers of combinations; and
calculating the second similarity based on a maximum value of the number of combinations indicated by the second distribution information.

12. A method of querying and retrieving images stored in a database, the method, executed by a processing device, comprising:

determining a combination of each of a plurality of regions in a first image and a corresponding one of a plurality of regions in a second image based on feature amounts, represented by a string of bits, of the regions in the first image and feature amounts of the regions in the second image;

generating first distribution information indicating distribution of the difference between a position of a first region in the first image and a position of a second region in the second image that are included in each of the combinations;

generating second distribution information indicating distribution of the difference between the position of the first region and the position of the second region by applying a spatial filter to the first distribution information;

calculating a first similarity between the first image and the second image based on the first distribution information;

calculating a second similarity between the first image and the second image based on the second distribution information;

generating a comparison result by comparing the first image and the second image based on the first similarity and the second similarity; and outputting, based on the comparison result, data representing one or more images stored in the database.

* * * * *